US010378407B2

(12) United States Patent
Kanno et al.

(10) Patent No.: US 10,378,407 B2
(45) Date of Patent: Aug. 13, 2019

(54) EXHAUST EMISSION CONTROL SYSTEM OF ENGINE

(71) Applicant: Mazda Motor Corporation, Aki-gun, Hiroshima (JP)

(72) Inventors: Masanobu Kanno, Hiroshima (JP); Takayuki Yamaguchi, Hatsukaichi (JP); Masayuki Tetsuno, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 152 days.

(21) Appl. No.: 15/647,473

(22) Filed: Jul. 12, 2017

(65) Prior Publication Data

US 2018/0038258 A1 Feb. 8, 2018

(30) Foreign Application Priority Data

Aug. 3, 2016 (JP) ................................. 2016-152479

(51) Int. Cl.
*F01N 3/20* (2006.01)
*F01N 3/08* (2006.01)

(52) U.S. Cl.
CPC ......... *F01N 3/2066* (2013.01); *F01N 3/0814* (2013.01); *F01N 3/0842* (2013.01);
(Continued)

(58) Field of Classification Search
CPC .... F01N 3/0814; F01N 3/0842; F01N 3/0878; F01N 3/2006; F01N 3/2066; F01N 3/208;
(Continued)

(56) References Cited

U.S. PATENT DOCUMENTS 8,671,665 B2 * 3/2014 Yasui ...................... F01N 3/208
60/286

FOREIGN PATENT DOCUMENTS

JP 3518398 B2 4/2004
JP 2010112345 A 5/2010

* cited by examiner

*Primary Examiner* — Audrey K Bradley

(74) *Attorney, Agent, or Firm* — Alleman Hall Creasman & Tuttle LLP

(57) ABSTRACT

An exhaust emission control system of an engine including a $NO_x$ catalyst for storing $NO_x$ within exhaust gas when an air-fuel ratio thereof is lean, and reducing the $NO_x$ when the air-fuel ratio is approximately stoichiometric or rich, the $NO_x$ catalyst also functioning as an oxidation catalyst for oxidizing HC, is provided. The system includes a SCR catalyst for purifying $NO_x$ by causing a reaction with $NH_3$, a urea injector, and a processor configured to execute a fuel injection controlling module, and a $NO_x$ reduction controlling module for performing a $NO_x$ reduction control to enrich the air-fuel ratio to a target ratio. When the urea injection is abnormal, the $NO_x$ reduction controlling module performs an $NH_3$-supplied $NO_x$ reduction control in which the $NO_x$ catalyst supplies $NH_3$ to the SCR catalyst, by performing the $NO_x$ reduction control, a lean air-fuel ratio operation control, and then the $NO_x$ reduction control again.

9 Claims, 13 Drawing Sheets

(52) U.S. Cl.
CPC ........... *F01N 3/0878* (2013.01); *F01N 3/208* (2013.01); *F01N 3/2006* (2013.01); *F01N 2430/06* (2013.01); *F01N 2430/085* (2013.01); *F01N 2570/14* (2013.01); *F01N 2610/02* (2013.01); *F01N 2900/1404* (2013.01); *Y02T 10/24* (2013.01)

(58) Field of Classification Search
CPC ........... F01N 2430/06; F01N 2430/085; F01N 2570/14; F01N 2610/02; F01N 2900/1404; Y02T 10/24
See application file for complete search history.

EXHAUST EMISSION CONTROL SYSTEM OF ENGINE

BACKGROUND

The present invention relates to an exhaust emission control system of an engine, and particularly to an exhaust emission control system which is provided on an exhaust passage with a $NO_x$ catalyst which purifies $NO_x$ in exhaust gas.

Conventionally, exhaust emission control systems of engines, which include a SCR catalyst disposed in an exhaust passage of the engine and for purifying $NO_x$ within exhaust gas by causing a reaction with $NH_3$ and a $NO_x$ storage catalyst that stores (occludes) $NO_x$ contained in exhaust gas when an air-fuel ratio of the exhaust gas is lean (i.e., $\lambda>1$, larger than a theoretical air-fuel ratio) are known (e.g., see JP3518398B). Such a $NO_x$ storage catalyst further reduces the stored $NO_x$ when the air-fuel ratio is approximately equal to stoichiometric (i.e., $\lambda\approx1$, approximately equal to the theoretical air-fuel ratio) or is rich (i.e., $\lambda<1$, smaller than the theoretical air-fuel ratio). In the exhaust emission control system of the engine, the SCR catalyst purifies $NO_x$ when an engine speed and an engine load are high, i.e., the temperature of the SCR catalyst is high, and otherwise the $NO_x$ catalyst purifies $NO_x$.

Further, JP2010-112345A discloses an art for performing $NO_x$ purification with a SCR catalyst by adsorbing $NH_3$ generated in a $NO_x$ reduction control of a $NO_x$ catalyst, instead of providing a urea injector for injecting urea to the SCR catalyst.

With the art of JP3518398B, if a urea injection by a urea injector is not performed normally within an operating range of the engine where the SCR catalyst purifies $NO_x$, i.e., the $NO_x$ catalyst does not purify $NO_x$, the $NO_x$ purification by the SCR catalyst becomes insufficient, and a problem arises in that a large amount of $NO_x$ is discharged.

Therefore, $NH_3$ generated in the $NO_x$ reduction control of the $NO_x$ catalyst may be supplied to the SCR catalyst (see JP2010-112345A).

However, the amount of $NH_3$ generated in the $NO_x$ reduction control by the $NO_x$ catalyst is comparatively small, thus causing not enough $NH_3$ to be supplied to the SCR catalyst to sufficiently purify $NO_x$.

SUMMARY

The present invention is made in view of the issues of the conventional arts described above, and aims to provide an exhaust emission control system of an engine, which is capable of raising a temperature of a $NO_x$ catalyst and supplying a comparatively large amount of $NH_3$ from the $NO_x$ catalyst to the SCR catalyst by performing a $NO_x$ reduction control in a state where the temperature of the $NO_x$ catalyst is raised so as to facilitate $NH_3$ generation in the $NO_x$ catalyst.

According to one aspect of the present invention, an exhaust emission control system of an engine, including a $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is approximately stoichiometric or rich, the $NO_x$ catalyst also functioning as an oxidation catalyst for oxidizing HC, is provided. The system includes a SCR catalyst disposed in the exhaust passage downstream of the $NO_x$ catalyst and for purifying $NO_x$ within exhaust gas by causing a reaction with $NH_3$, a urea injector for supplying urea to the SCR catalyst by injecting urea to the exhaust passage, and a processor configured to execute a fuel injection controlling module for controlling a fuel injector, and a $NO_x$ reduction controlling module for performing a $NO_x$ reduction control in which the air-fuel ratio is enriched to reach a target air-fuel ratio so that the stored $NO_x$ is reduced, the target air-fuel ratio being a ratio at which the stored $NO_x$ is reducible. When the urea injection by the urea injector is determined to be abnormal, the $NO_x$ reduction controlling module performs a $NH_3$-supplied $NO_x$ reduction control in which the $NO_x$ catalyst supplies $NH_3$ to the SCR catalyst, by performing the $NO_x$ reduction control, a lean air-fuel ratio operation control, and then the $NO_x$ reduction control again, the lean air-fuel ratio operation control being a control in which the air-fuel ratio becomes leaner than the target air-fuel ratio.

With this configuration, when the urea injection by the urea injector is determined to be abnormal, the $NO_x$ reduction controlling module performs the $NO_x$ reduction control in which the air-fuel ratio of the exhaust gas is enriched, and then performs the lean air-fuel ratio operation control in which the air-fuel ratio of the exhaust gas becomes leaner than the target air-fuel ratio. Therefore, the temperatures of the oxidation catalyst and the $NO_x$ catalyst are raised by the reaction between oxygen and HC adsorbed by the oxidation catalyst. By performing the $NO_x$ reduction control again in the state where the temperature of the $NO_x$ catalyst is raised, it becomes easier for $NH_3$ to be generated in the $NO_x$ catalyst and the comparatively large amount of $NH_3$ is supplied from the $NO_x$ catalyst to the SCR catalyst. Therefore, when the urea injection by the urea injector is determined to be abnormal, it is prevented that $NH_3$ adsorbed by the SCR catalyst becomes insufficient for the SCR catalyst to purify $NO_x$, and the adsorption amount of $NH_3$ in the SCR catalyst is increased so that the purification rate of $NO_x$ within exhaust gas by the SCR catalyst becomes higher. Thus, the $NO_x$ discharge amount is reduced.

The lean air-fuel ratio operation control may be performed by stopping the $NO_x$ reduction control to bring an operating state of the engine to a normal operating state where the air-fuel ratio becomes lean.

With this configuration, the lean air-fuel ratio operation control is performed by stopping the $NO_x$ reduction control to bring the operating state of the engine to the normal operating state where the air-fuel ratio becomes lean (i.e., leaner than a theoretical air-fuel ratio). Therefore, the lean air-fuel ratio operation control is performed by a comparatively simple control, the temperatures of the oxidation catalyst and the $NO_x$ catalyst are raised comparatively easily by the reaction between oxygen and HC adsorbed by the oxidation catalyst, and the comparatively large amount of $NH_3$ is supplied from the $NO_x$ catalyst to the SCR catalyst.

The $NO_x$ reduction controlling module may repeatedly perform a temperature raising control of the $NO_x$ catalyst by performing the $NO_x$ reduction control and then the lean air-fuel ratio operation control until the temperature of the $NO_x$ catalyst reaches a target temperature, and when the temperature of the $NO_x$ catalyst reaches the target temperature, the $NO_x$ reduction controlling module may perform the $NH_3$-supplied $NO_x$ reduction control by performing the $NO_x$ reduction control without performing the temperature raising control.

With this configuration, the $NO_x$ reduction controlling module repeatedly performs the temperature raising control of the $NO_x$ catalyst by performing the $NO_x$ reduction control and then the lean air-fuel ratio operation control until the temperature of the $NO_x$ catalyst reaches the target temperature. After the temperature of the $NO_x$ catalyst reaches the target temperature, the $NO_x$ reduction controlling module performs the $NO_x$ reduction control without performing the temperature raising control. In other words, the $NO_x$ reduction control is performed in the state where the temperature of the $NO_x$ catalyst is raised to the target temperature at which the $NH_3$ generation becomes easy. Thus, it becomes easier for $NH_3$ to be generated in the $NO_x$ catalyst and the comparatively large amount of $NH_3$ is supplied from the $NO_x$ catalyst to the SCR catalyst.

The $NO_x$ reduction controlling module may start the lean air-fuel ratio operation control after an estimated value of a supply amount of HC to the oxidation catalyst of the $NO_x$ catalyst reaches a given value corresponding to a required amount for raising the temperature of the $NO_x$ catalyst to a target temperature.

With this configuration, the $NO_x$ reduction controlling module starts the lean air-fuel ratio operation control after the estimated value of the supply amount of HC to the oxidation catalyst of the $NO_x$ catalyst reaches the given value corresponding to a required amount for raising the temperature to the target temperature. Therefore, the temperatures of the oxidation catalyst and the $NO_x$ catalyst are raised to the target temperatures by the reaction between oxygen and HC adsorbed by the oxidation catalyst. Thus, the temperature of the $NO_x$ catalyst is raised toward the target temperature in the lean air-fuel ratio operation control, and by performing the $NO_x$ reduction control in the state where the temperature of the $NO_x$ catalyst is raised to the target temperature at which the $NH_3$ generation becomes easy, it becomes easier for $NH_3$ to be generated in the $NO_x$ catalyst and the comparatively large amount of $NH_3$ is supplied from the $NO_x$ catalyst to the SCR catalyst.

The $NO_x$ reduction controlling module may terminate the lean air-fuel ratio operation control when a reaction time that is calculated based on an estimated value of a supply amount of HC to the oxidation catalyst of the $NO_x$ catalyst, and is assumed to be required for completing reaction between HC and oxygen, elapses.

With this configuration, the lean air-fuel ratio operation control is terminated when the reaction time which is calculated based on the estimated value of the supply amount of HC to the oxidation catalyst of the $NO_x$ catalyst and is assumed to be required for completing the reaction between HC and oxygen elapses. Thus, HC adsorbed by the oxidation catalyst effectively reacts with oxygen during the lean air-fuel ratio operation control, and the temperatures of the oxidation catalyst and the $NO_x$ catalyst are efficiently raised by the reaction between oxygen and HC adsorbed by the oxidation catalyst.

Only when the urea injection by the urea injector is determined to be abnormal, the $NO_x$ reduction controlling module may perform a temperature raising control of the $NO_x$ catalyst by performing the $NO_x$ reduction control and then performing the lean air-fuel ratio operation control.

With this configuration, only when the urea injection by the urea injector is determined to be abnormal, the temperature raising control of the $NO_x$ catalyst is performed by performing the $NO_x$ reduction control and then performing the lean air-fuel ratio operation control. Therefore, other than when the urea injection by the urea injector is determined to be abnormal, the $NO_x$ reduction control is reliably performed without executing the lean air-fuel ratio operation control and the temperature raising control accompanied thereby.

When urea supplied to the urea injector is frozen, the $NO_x$ reduction controlling module may perform the $NH_3$-supplied $NO_x$ reduction control in which the $NO_x$ catalyst supplies $NH_3$ to the SCR catalyst, by performing the $NO_x$ reduction control, the lean air-fuel ratio operation control, and then the $NO_x$ reduction control again.

With this configuration, when urea supplied to the urea injector is frozen, it is prevented that $NH_3$ adsorbed by the SCR catalyst becomes insufficient for the SCR catalyst to purify $NO_x$, and the adsorption amount of $NH_3$ in the SCR catalyst is increased so that the purification rate of $NO_x$ within exhaust gas by the SCR catalyst becomes higher. Thus, the $NO_x$ discharge amount is reduced.

When performing the $NO_x$ reduction control after the lean air-fuel ratio operation control, the $NO_x$ reduction controlling module may set a post injection timing in the $NO_x$ reduction control so that the fuel injected in a post injection is combusted inside a cylinder of the engine.

With this configuration, when performing the $NO_x$ reduction control after the lean air-fuel ratio operation control, the post injection timing in the $NO_x$ reduction control is set so that the fuel injected in the post injection is combusted inside the cylinder of the engine. Therefore, discharge of the fuel injected in the post injection as unburned fuel or oil dilution due to the fuel injected in the post injection is prevented.

The $NO_x$ reduction controlling module may perform the $NH_3$-supplied $NO_x$ reduction control when the temperature of the exhaust gas is comparatively high and $NO_x$ within the exhaust gas is required to be purified by the SCR catalyst.

With this configuration, when the urea injection by the urea injector is determined to be abnormal in the case where the temperature of the exhaust gas is comparatively high and $NO_x$ within the exhaust gas is required to be purified by the SCR catalyst, the $NO_x$ reduction controlling module performs the $NH_3$-supplied $NO_x$ reduction control. Therefore, it is prevented that $NH_3$ adsorbed by the SCR catalyst becomes insufficient for the SCR catalyst to purify $NO_x$, and the adsorption amount of $NH_3$ in the SCR catalyst is increased so that the purification rate of $NO_x$ within exhaust gas by the SCR catalyst becomes higher. Thus, the $NO_x$ discharge amount is reduced.

DETAILED DESCRIPTION OF EMBODIMENT

Hereinafter, an exhaust emission control system of an engine according to one embodiment of the present invention is described with reference to the accompanying drawings.

<System Configuration>

First, an engine system to which the exhaust emission control system of the engine of this embodiment is applied is described with reference to a schematic configuration view of the engine system in FIG. 1.

Figure 1:
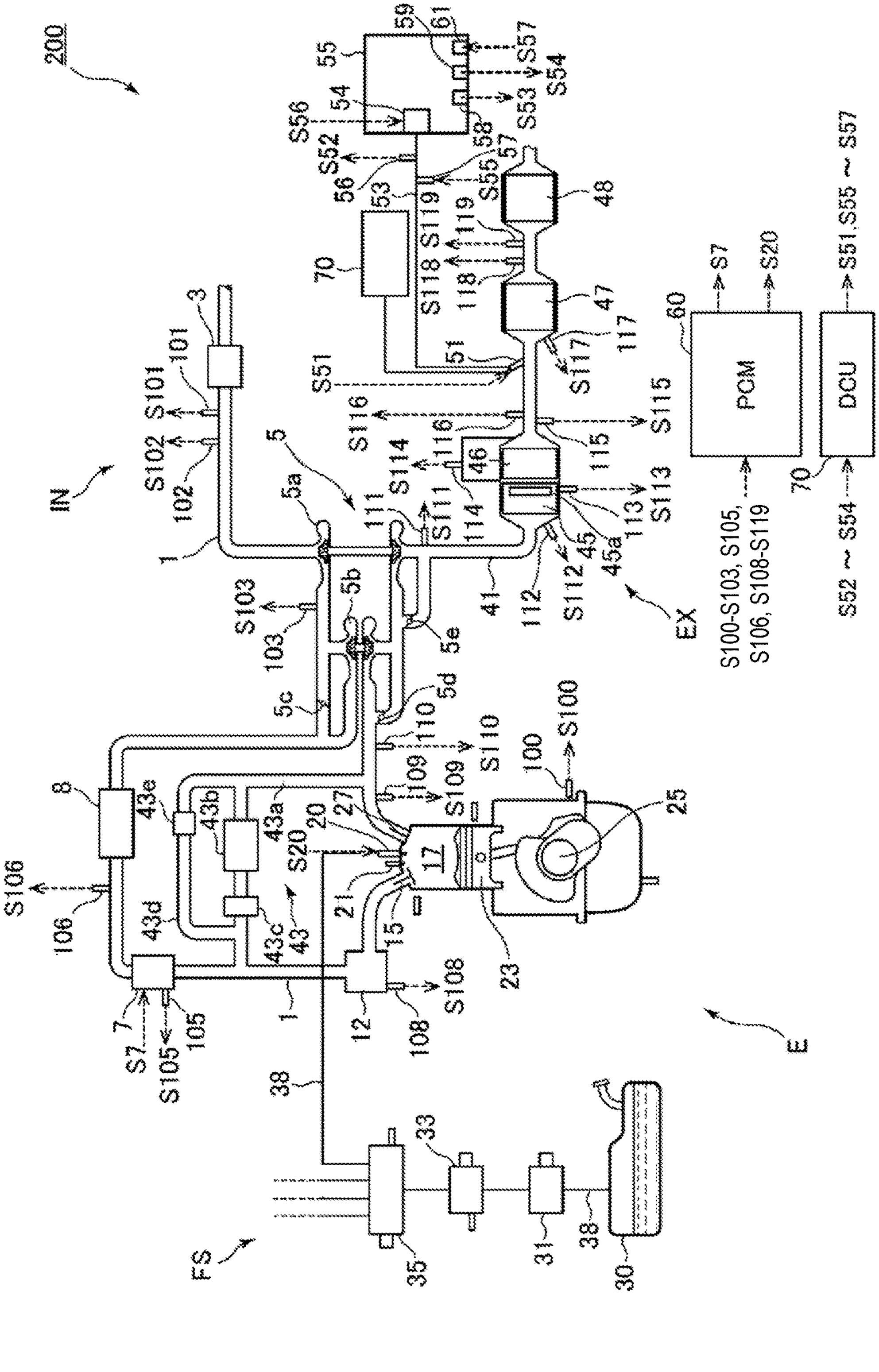
FIG. 1 is a view illustrating a schematic configuration of an engine system to which an exhaust emission control system of an engine according to one embodiment of the present invention is applied.

As illustrated in FIG. 1, the engine system 200 mainly includes a diesel engine as an engine E, an intake system IN for supplying intake air into the engine E, a fuel supply system FS for supplying fuel into the engine E, an exhaust system EX for discharging exhaust gas from the engine E, sensors 100 to 103, 105, 106 and 108 to 119 for detecting various states relating to the engine system 200, a PCM (Power-train Control Module) 60 for controlling the engine system 200, and a DCU (Dosing Control Unit) 70 for performing a control relating to a SCR (Selective Catalytic Reduction) catalyst 47.

First, the intake system IN includes an intake passage 1 through which intake air passes. In the intake passage 1, an air cleaner 3 for purifying air introduced from outside, a compressor of a turbocharger 5 for compressing intake air passing therethrough to increase pressure of the intake air, an intercooler 8 for cooling the intake air with outdoor air or coolant, an intake shutter valve 7 (corresponding to a throttle valve) for adjusting a flow rate of intake air passing therethrough, and a surge tank 12 for temporarily storing intake air to be supplied into the engine E are provided in this order from the upstream.

Further in the intake system IN, an airflow sensor 101 for detecting an intake air amount and a temperature sensor 102 for detecting an intake air temperature are disposed in the intake passage 1 immediately downstream of the air cleaner 3. A pressure sensor 103 for detecting pressure of the intake air is provided to the turbocharger 5. A temperature sensor 106 for detecting an intake air temperature is disposed in the intake passage 1 immediately downstream of the intercooler 8. A position sensor 105 for detecting an opening of the intake shutter valve 7 is provided to the intake shutter valve 7. A pressure sensor 108 for detecting pressure of intake air in an intake manifold is provided to the surge tank 12. The various sensors 101 to 103, 105, 106 and 108 provided in the intake system IN output detection signals S101 to S103, S105, S106 and S108 corresponding to the detected parameters to the PCM 60, respectively.

Next, the engine E includes an intake valve 15 for introducing the intake air supplied from the intake passage 1 (more specifically, intake manifold) into a combustion chamber 17, a fuel injector 20 for injecting fuel to the combustion chamber 17, a glow plug 21 provided with a heat generating part 21*a* for generating heat when energized, a piston 23 for reciprocating due to combustion of air-fuel mixture within the combustion chamber 17, a crankshaft 25 for rotating due to the reciprocation of the piston 23, and an exhaust valve 27 for discharging the exhaust gas generated by the combustion of the air-fuel mixture within the combustion chamber 17 to an exhaust passage 41. The engine E is also provided with a crank angle sensor 100 for detecting a crank angle which is a rotational angle of the crankshaft 25 measured, for example, with reference to a top dead center. The crank angle sensor 100 outputs a detection signal S100 corresponding to the detected crank angle to the PCM 60 which acquires an engine speed based on the detection signal S100.

The fuel supply system FS has a fuel tank 30 for storing the fuel and a fuel supply passage 38 for supplying the fuel from the fuel tank 30 to the fuel injector 20. In the fuel supply passage 38, a low-pressure fuel pump 31, a high-pressure fuel pump 33, and a common rail 35 are disposed in this order from the upstream.

Next, the exhaust system EX includes the exhaust passage 41 through which the exhaust gas passes. In the exhaust passage 41, a turbine of the turbocharger 5 which is rotated by the exhaust gas passing therethrough and drives the compressor by this rotation is disposed. Further the following components are disposed in the exhaust passage 41 on the downstream side of the turbine in the following order from the upstream: a $NO_x$ catalyst 45 for purifying $NO_x$ within the exhaust gas; a diesel particulate filter (DPF) 46 for capturing particulate matter (PM) within the exhaust gas; a urea injector 51 for injecting urea (typically, urea water) into the exhaust passage 41 downstream of the DPF 46; the SCR catalyst 47 for producing ammonia by hydrolysis of urea injected by the urea injector 51 ($CO(NH_2)_2+H_2O \rightarrow CO_2+2NH_3$) and purifying $NO_x$ by causing a reaction (reduction) of this ammonia with $NO_x$ within the exhaust gas; and a slip catalyst 48 for oxidizing ammonia released from the SCR catalyst 47 to purify it. Note that the urea injector 51 is controlled to inject urea into the exhaust passage 41 based on a control signal S51 supplied from the DCU 70.

Here, the $NO_x$ catalyst 45 and the SCR catalyst 47 are described more in detail. The $NO_x$ catalyst 45 is a $NO_x$ storage catalyst (NSC) which stores $NO_x$ contained within the exhaust gas when an air-fuel ratio of the exhaust gas is lean (i.e., $\lambda>1$, larger than a theoretical air-fuel ratio), and reduces the stored $NO_x$ when the air-fuel ratio is approximately equal to stoichiometric (i.e., $\lambda \approx 1$, approximately equal to the theoretical air-fuel ratio) or is rich (i.e., $\lambda<1$, smaller than the theoretical air-fuel ratio). The $NO_x$ catalyst 45 generates ammonia when reducing the stored $NO_x$, and releases it. For example, in the $NO_x$ reduction control, ammonia ($NH_3$) is generated by combining "N" within $NO_x$ stored in the $NO_x$ catalyst 45 and "H" within "HC," such as unburned fuel supplied to the $NO_x$ catalyst 45 as a reducing agent, or "H" within "$H_2O$" generated by in-cylinder combustion.

The $NO_x$ catalyst 45 functions, not only as the NSC, but also as a diesel oxidation catalyst (DOC) 45*a* (oxidation catalyst) which oxidizes hydrocarbon (HC), carbon monoxide (CO), etc. using oxygen within the exhaust gas to convert them into water and carbon dioxide. For example, the $NO_x$ catalyst 45 is made by coating a surface of a catalyst material layer of the diesel oxidation catalyst 45*a* with a catalyst material of NSC. Therefore, the $NO_x$ catalyst 45 forms a composite catalyst combined with the diesel oxidation catalyst 45*a*. Thus, when the temperature of the diesel oxidation catalyst 45*a* rises due to heat caused by oxidation, this heat is transmitted to the $NO_x$ catalyst 45 and increases the temperature of the catalyst 45.

On the other hand, the SCR catalyst 47 adsorbs ammonia generated by urea injected from the urea injector 51 and ammonia generated by the $NO_x$ reduction in the $NO_x$ catalyst 45, and causes reaction of the adsorbed ammonia with $NO_x$ to reduce and purify $NO_x$. For example, the SCR catalyst 47 is made by supporting catalyst metal which reduces $NO_x$ with ammonia on a zeolite which traps ammonia to form a catalyst component, and supporting this catalyst component on a cell wall of a honeycomb carrier. Fe, Ti, Ce, W, etc. is used as the catalyst metal for $NO_x$ reduction.

Note that in view of achieving both of securing the $NO_x$ purification performance by the SCR catalyst 47 and preventing the release (slip) of ammonia from the SCR catalyst 47, the DCU 70 controls the urea injector 51 to inject urea so that a suitable amount of ammonia is adsorbed to the SCR catalyst 47. In this case, since the ammonia adsorption capacity changes according to the temperature of the SCR catalyst 47 (specifically, it becomes easier for ammonia to be released from the SCR catalyst 47 as the temperature of the SCR catalyst 47 increases), the DCU 70 controls the urea injector 51 to inject urea in consideration of the temperature of the SCR catalyst 47.

The urea injector 51 is disposed in the exhaust passage 41 upstream of the SCR catalyst 47 and downstream of the $NO_x$ catalyst 45. The urea injector 51 is connected to a urea supply path 53, and the urea supply path 53 is connected to a urea tank 55 via a urea sending pump 54. The urea supply path 53 is formed by piping which is capable of sending urea (urea water). A urea supply path pressure sensor 56 for measuring a change in pressure when urea passes therethrough is disposed in the urea supply path 53. A urea path heater 57 for preventing urea from freezing in the urea supply path 53 is disposed in the urea supply path 53. The urea sending pump 54, in response to a control command from the DCU 70, sends urea from the urea tank 55 to the urea injector 51.

The urea tank 55 is capable of storing urea. A urea level sensor 58, a urea temperature sensor 59, and a urea tank heater 61 are provided in the urea tank 55. The urea level sensor 58 detects the water level of urea in the urea tank 55. The urea temperature sensor 59 detects the temperature of urea in the urea tank 55. The urea tank heater 61 heats up urea in the urea tank 55. When urea in the urea tank 55 is completely or partially frozen, the urea tank heater 61 heats up the urea to change the frozen state and back to the liquid state.

The DCU 70 is electrically connected to the urea supply path pressure sensor 56, the urea level sensor 58, and the urea temperature sensor 59. The urea supply path pressure sensor 56, the urea level sensor 58, and the urea temperature sensor 59 output detection signals S52 to S54 corresponding to the detected parameters to the DCU 70, respectively. In addition, the DCU 70 is electrically connected to the urea path heater 57, the urea sending pump 54, and the urea tank heater 61. Operating states of the urea path heater 57, the urea sending pump 54, and the urea tank heater 61 are controlled by control signals S55 to S57 supplied from the DCU 70, respectively.

The DCU 70 is comprised of a computer including a processor 70A (e.g., a CPU (central processing unit)), various programs which are interpreted and executed on the processor (including a basic control program, such as an OS, and an application program activated on the OS to realize a specific function), and an internal memory such as ROM(s) and/or RAM(s), for storing programs and various data. The DCU 70 is connected to the PCM 60 to be mutually communicable and is controlled by the PCM 60 upon receiving a control command.

Further in the exhaust system EX, as illustrated in FIG. 1, a pressure sensor 109 for detecting pressure of the exhaust gas and a temperature sensor 110 for detecting an exhaust gas temperature are disposed in the exhaust passage 41 upstream of the turbine of the turbocharger 5. An $O_2$ sensor 111 for detecting an oxygen concentration within the exhaust gas is disposed in the exhaust passage 41 immediately downstream of the turbine of the turbocharger 5. Moreover, the exhaust system EX includes a temperature sensor 112 for detecting an exhaust gas temperature at a position immediately upstream of the $NO_x$ catalyst 45, a temperature sensor 113 for detecting an exhaust gas temperature at a position between the $NO_x$ catalyst 45 and the DPF 46, a pressure difference sensor 114 for detecting a pressure difference of exhaust gas between positions immediately upstream and downstream of the DPF 46, a temperature sensor 115 for detecting an exhaust gas temperature at a position immediately downstream of the DPF 46, an $NO_x$ sensor 116 for detecting a concentration of $NO_x$ within the exhaust gas at a position immediately downstream of the DPF 46, a temperature sensor 117 for detecting an exhaust gas temperature at a position immediately upstream of the SCR catalyst 47, a $NO_x$ sensor 118 for detecting a concentration of $NO_x$ within the exhaust gas at a position immediately downstream of the SCR catalyst 47, and a PM sensor 119 for detecting PM within the exhaust gas at a position immediately upstream of the slip catalyst 48. The various sensors 109 to 119 provided in the exhaust system EX output detection signals S109 to S119 corresponding to the detected parameters to the PCM 60, respectively.

In this embodiment, the turbocharger 5 is configured as a two-stage turbocharging system capable of efficiently obtaining high turbocharging performance in all low to high engine speed ranges. The exhaust energy is low within the low engine speed range. That is, the turbocharger 5 includes a large turbocharger *5a* for turbocharging a large amount of air within a high engine speed range, a small turbocharger *5b* capable of performing efficient turbocharging even with low exhaust energy, a compressor bypass valve *5c* for controlling the flow of intake air to a compressor of the small turbocharger *5b*, a regulator valve *5d* for controlling the flow of exhaust gas to a turbine of the small turbocharger *5b*, and a wastegate valve *5e* for controlling the flow of exhaust gas to a turbine of the large turbocharger *5a*. By driving each valve in accordance with the operating state of the engine E (engine speed and load), the operated turbocharger is switched between the large turbocharger *5a* and the small turbocharger *5b*.

The engine system 200 of this embodiment also includes an exhaust gas recirculation (EGR) device 43. The EGR device 43 includes an EGR passage *43a* connecting a position of the exhaust passage 41 upstream of the turbine of the turbocharger 5 with a position of the intake passage 1 downstream of the compressor of the turbocharger 5 (more specifically, downstream of the intercooler 8), an EGR cooler *43b* for cooling the exhaust gas passing through the EGR passage *43a*, a first EGR valve *43c* for adjusting a flow rate of the exhaust gas passing through the EGR passage *43a*, an EGR cooler bypass passage *43d* for causing the exhaust gas to bypass the EGR cooler *43b*, and a second EGR valve *43e* for adjusting a flow rate of the exhaust gas passing through the EGR cooler bypass passage *43d*.

Figure 2:
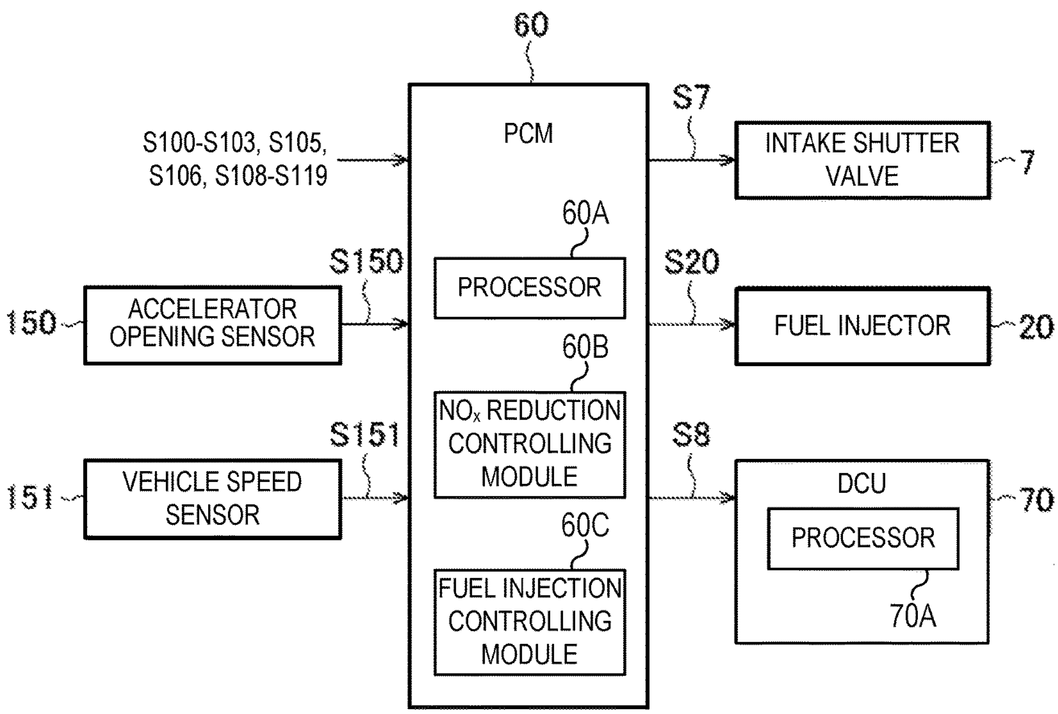
FIG. 2 is a block diagram illustrating an electrical configuration of the exhaust emission control system of the engine of the embodiment.

Next, an electrical configuration of the exhaust emission control system of the engine of the embodiment is described with reference to FIG. 2.

Based on the detection signals S100 to S103, S105, S106, S108 to S119 of the various sensors 100 to 103, 105, 106 and 108 to 119 described above, and detection signals S150 and S151 outputted by an accelerator opening sensor 150 for detecting a position of an accelerator pedal (accelerator opening) and a vehicle speed sensor 151 for detecting a vehicle speed, respectively, the PCM 60 of this embodiment outputs a control signal S20 for mainly controlling the fuel injector 20, and a control signal S7 for controlling the intake shutter valve 7. Further, the PCM 60 mutually communicates with the DCU 70 to output a control signal S8 for controlling the DCU 70 so that the injector 51 supplies urea into the exhaust passage 41, or the urea tank heater 61 melts frozen urea in the urea tank 55, etc.

Particularly in this embodiment, the PCM 60 executes a $NO_x$ reduction control in which the fuel injector 20 is controlled to perform a post injection to control the air-fuel ratio of the exhaust gas to a target air-fuel ratio (specifically, a given air-fuel ratio approximately equal to or smaller than a theoretical air-fuel ratio), so that the $NO_x$ catalyst 45 is controlled to reduce $NO_x$ stored therein. In other words, the PCM 60 performs the post injection after a main injection. In the main injection, the fuel is injected into the cylinder (in the main injection, typically various settings including a fuel injection amount are executed utilized to obtain a lean air-fuel ratio) so as to output an engine torque according to an accelerator operation by a vehicle operator. In the post injection, the fuel is injected at a timing so that the engine torque output is not influenced (e.g., expansion stroke) so as to achieve $\lambda \approx 1$ or $\lambda < 1$ and reduce $NO_x$ stored in the $NO_x$ catalyst 45. Hereinafter, such a control for reducing $NO_x$ stored in the $NO_x$ catalyst 45 is referred to as "De$NO_x$ control." Note that "De" in the word "De$NO_x$" is a prefix meaning separation or removal. Note that the $NH_3$-supplied De$NO_x$ control described later is also included in the "De$NO_x$ control" since it performs a control for reducing $NO_x$ stored in the $NO_x$ catalyst 45.

Note that the PCM 60 is comprised of a processor 60A (e.g., a CPU (central processing unit)), various programs which are interpreted and executed on the processor 60A (including a basic control program, such as an OS, and an application program activated on the OS and realizing a specific function), and an internal memory such as ROM(s) and/or RAM(s), for storing programs and various data. The processor 60A is configured to execute at least a $NO_x$ reduction controlling module 60B to perform the $NO_x$ reduction control and a fuel injection controlling module 60C to perform a fuel injection control. These modules are stored in the internal memory as one or more software programs.

<Fuel Injection Control>

Figure 3:
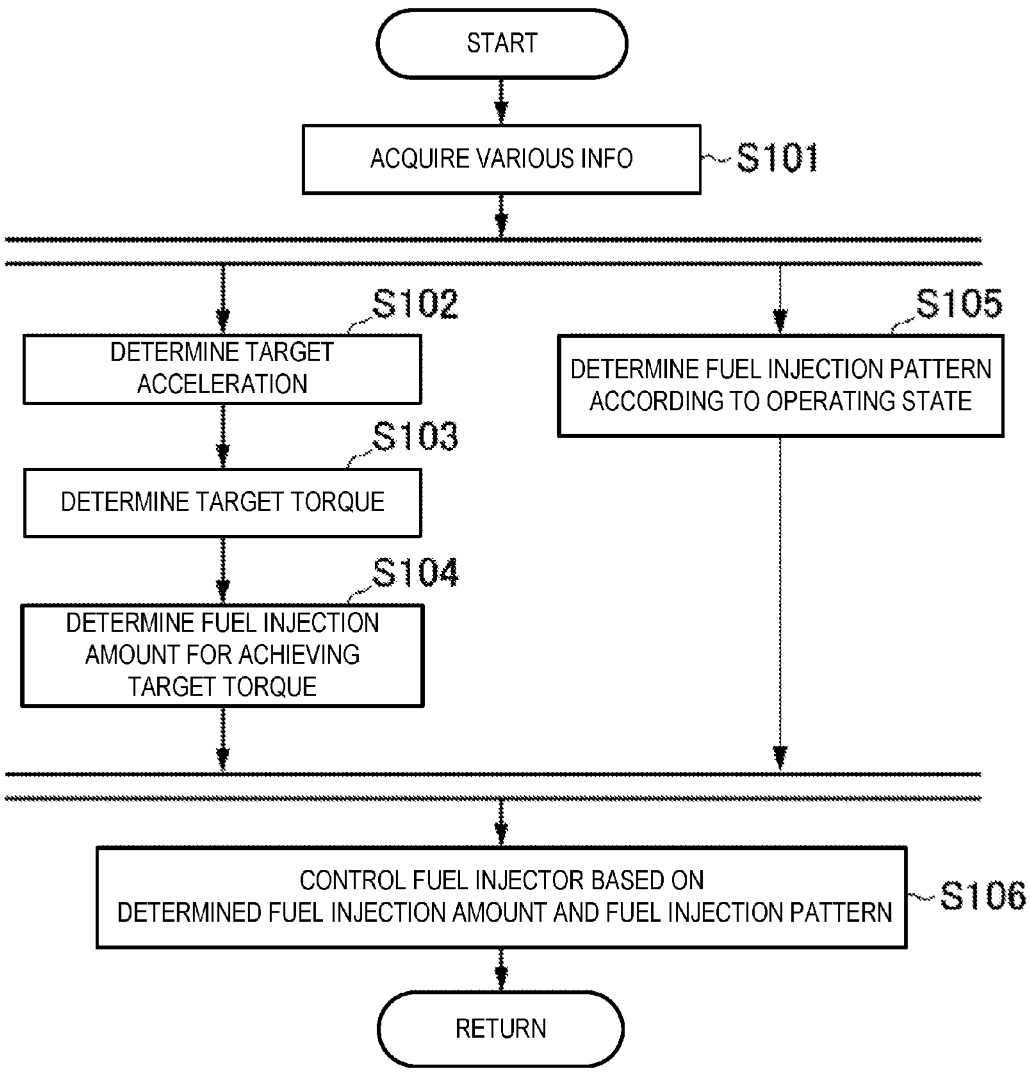
FIG. 3 is a flowchart illustrating a fuel injection control of the embodiment.

Next, a fuel injection control of this embodiment is described with reference to the flowchart (fuel injection control process) of FIG. 3. This fuel injection control process is started when an ignition of the vehicle is turned on and the PCM 60 is powered on, and repeatedly executed at a given cycle.

First, at S101, the PCM 60 acquires an operating state of the vehicle. For example, the PCM 60 acquires at least the accelerator opening detected by the accelerator opening sensor 150, the vehicle speed detected by the vehicle speed sensor 151, the crank angle detected by the crank angle sensor 100, and a gear range currently set in a transmission of the vehicle.

Next, at S102, the PCM 60 sets a target acceleration based on the acquired operating state of the vehicle at S101. For example, the PCM 60 selects, from a plurality of acceleration characteristic maps (created in advance and stored in the memory) defined for various vehicle speeds and various gear ranges, an acceleration characteristic map corresponding to the current vehicle speed and gear range, and determines the target acceleration corresponding to the current accelerator opening by referring to the selected acceleration characteristic map.

Next, at S103, the PCM 60 determines a target torque of the engine E to achieve the target acceleration determined at S102. In this case, the PCM 60 determines the target torque within a range of torque which the engine E is possible to output, based on the current vehicle speed, the gear range, a current road surface inclination, a road surface a, etc.

Next, at S104, the PCM 60 calculates the fuel injection amount to be injected from the fuel injector 20 based on the target torque and the engine speed, so as to output the target torque from the engine E determined at S103. This fuel injection amount is applied in the main injection (main injection amount).

On the other hand, in parallel with the processes at S102 to S104, the PCM 60 sets a fuel injection pattern according to the operating state of the engine E at S105. For example, when executing the above De$NO_x$ control, the PCM 60 sets a fuel injection pattern in which at least the post injection is performed in addition to the main injection. In this case, the PCM 60 also determines the fuel injection amount applied in the post injection (post injection amount) and the timing to perform the post injection (post injection timing, etc.), of which details are described later.

Then, the process proceeds to S106 where the PCM 60 controls the fuel injector 20 based on the main injection amount calculated at S104 and the fuel injection pattern set at S105 (including the post injection amount and the post injection timing in the case where the post injection is performed). In other words, the PCM 60 controls the fuel injector 20 so that a desired amount of fuel is injected in a desired fuel injection pattern.

<De$NO_x$ Control>

Hereinafter, the De$NO_x$ control of this embodiment is described in detail.

First, a basic concept of the De$NO_x$ control of this embodiment is described. In this embodiment, when the $NO_x$ stored amount in the $NO_x$ catalyst 45 is above a given amount, typically when the $NO_x$ stored amount is approximately equal to a limit value (e.g., the capacity of the $NO_x$ catalyst 45), the PCM 60 executes a De$NO_x$ control in which the fuel injector 20 is controlled to perform the post injection so that the air-fuel ratio is continuously controlled to the target air-fuel ratio, in order to reduce $NO_x$ stored in the $NO_x$ catalyst 45 to substantially zero (may suitably be referred to as "active De$NO_x$ control"). In this manner, a large amount of $NO_x$ stored in the $NO_x$ catalyst 45 is forcibly reduced and the $NO_x$ purification performance of the $NO_x$ catalyst 45 is reliably secured.

Even if the $NO_x$ stored amount in the $NO_x$ catalyst 45 is below the given amount, when the air-fuel ratio becomes rich due to acceleration of the vehicle, the PCM 60 executes a De$NO_x$ control in which the fuel injector 20 is controlled to perform the post injection so as to temporarily control the air-fuel ratio to the target air-fuel ratio, in order to reduce $NO_x$ stored in the $NO_x$ catalyst 45 (may suitably be referred to as "passive De$NO_x$ control"). In the passive De$NO_x$ control, the post injection is performed to control the air-fuel ratio to approximately equal to or smaller than the theoretical air-fuel ratio under a situation where the air-fuel ratio reduces due to the increase of the main injection amount, such as during acceleration of the vehicle. Therefore, the post injection amount for controlling the air-fuel ratio to the target air-fuel ratio is smaller compared to a case of executing the De$NO_x$ control in a situation where the air-fuel ratio does not reduce (i.e., no acceleration). Moreover, since the passive $DeNO_x$ control is executed accompanying the acceleration of the vehicle, the frequency of executing this control is comparatively high.

In this embodiment, when the urea injection by the urea injector 51 is determined to be abnormal in the situation where the $NO_x$ is to be purified by the SCR catalyst 47, the $DeNO_x$ control for causing the $NO_x$ catalyst 45 to supply $NH_3$ to the SCR catalyst 47 (hereinafter, suitably referred to as "$NH_3$-supplied $DeNO_x$ control") is executed in order to prevent that $NH_3$ adsorbed by the SCR catalyst 47 is insufficient for the SCR catalyst 47 to purify $NO_x$. In the $NH_3$-supplied $DeNO_x$ control, the $NO_x$ reduction control in which the air-fuel ratio is enriched is executed to cause the $NO_x$ catalyst 45 to supply $NH_3$ to the SCR catalyst 47 so as to bring the purification rate of $NO_x$ within exhaust gas by the SCR catalyst 47 higher by increasing the adsorption amount of $NH_3$ in the SCR catalyst 47.

In this embodiment, by applying such a passive $DeNO_x$ control, $DeNO_x$ is performed frequently while preventing a fuel consumption increase due to $DeNO_x$. Although the passive $DeNO_x$ control is executed only for a comparatively short period of time, since it is executed frequently, the $NO_x$ stored amount in the $NO_x$ catalyst 45 is efficiently reduced. As a result, the $NO_x$ stored amount in the $NO_x$ catalyst 45 does not easily exceed the given amount, therefore the execution frequency of the active $DeNO_x$ control that requires a larger amount of post injection amount than in the passive $DeNO_x$ control is lowered, and thus it becomes possible to effectively prevent the fuel consumption increase due to $DeNO_x$.

Further in this embodiment, when executing the above active $DeNO_x$ control, the fuel injected in the post injection (hereinafter, referred to as "post-injected fuel") is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in an early half of the expansion stroke of the engine E as the post injection timing of the active $DeNO_x$ control. By applying such a post injection timing to the active $DeNO_x$ control, it is possible to prevent discharge of the post-injected fuel as unburned fuel (i.e., HC) or oil dilution due to the post-injected fuel.

On the other hand, in this embodiment, when executing the passive $DeNO_x$ control, the PCM 60 controls the air-fuel ratio to the target air-fuel ratio by discharging the post-injected fuel as unburned fuel into the exhaust passage 41 without combusting it inside the cylinder of the engine E. In this case, the PCM 60 performs the post injection at a timing so that the post-injected fuel is discharged from the cylinder to the exhaust passage 41 as unburned fuel. For example, the PCM 60 sets a given timing in a latter half of the expansion stroke of the engine E as the post injection timing of the passive $DeNO_x$ control. By applying such a post injection timing to the passive $DeNO_x$ control, generation of smoke (soot) due to the post-injected fuel is combusted inside the cylinder is prevented.

Furthermore, in this embodiment, when executing the $NH_3$-supplied $DeNO_x$ control, the post-injected fuel is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in the early half of the expansion stroke of the engine E as the post injection timing of the $NH_3$-supplied $DeNO_x$ control. By applying such a post injection timing to the $NH_3$-supplied $DeNO_x$ control, discharge of the post-injected fuel as unburned fuel (i.e., HC) and oil dilution caused by the post-injected fuel are prevented.

Here, operating ranges of the engine E within which the passive $DeNO_x$ control and the active $DeNO_x$ control are executed in this embodiment are described with reference to FIG. 4 in which the horizontal axis shows engine speed and the vertical axis shows engine load. Further in FIG. 4, the curve L1 indicates a highest torque line of the engine E.

Figure 4:
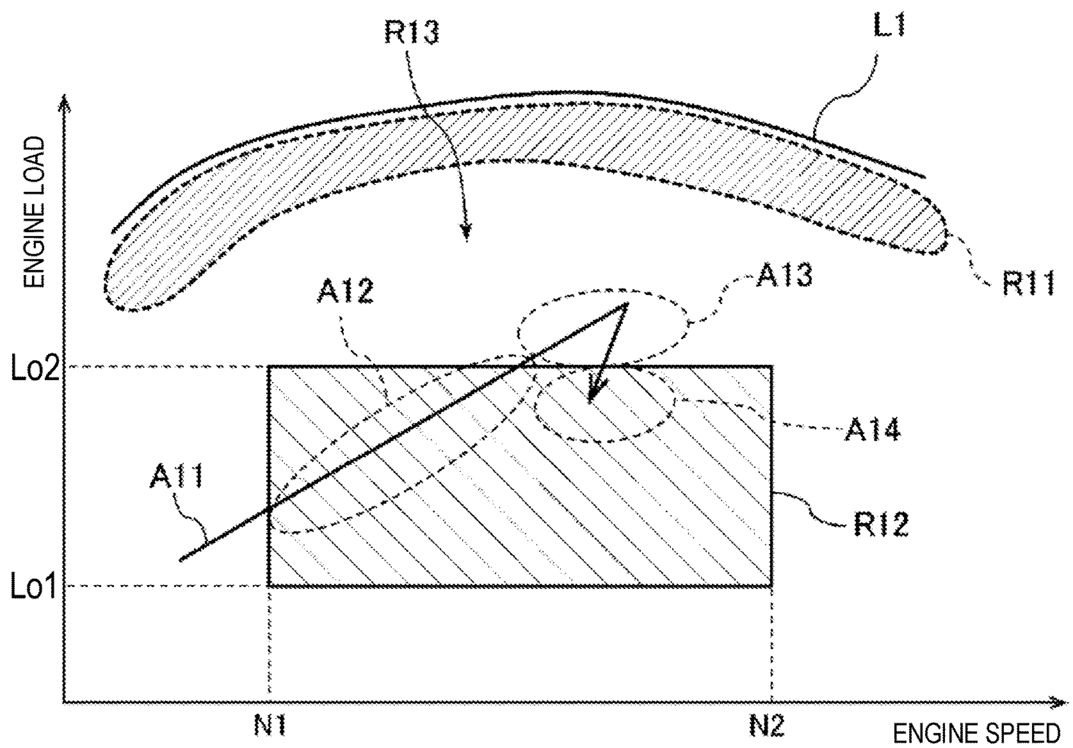
FIG. 4 is a chart illustrating operating ranges of the engine within which a passive $DeNO_x$ control and an active $DeNO_x$ control are performed, respectively, in the embodiment.

As illustrated in FIG. 4, in this embodiment, the PCM 60 executes the active $DeNO_x$ control when the engine load is within a medium load range equal to and higher than a first load Lo1 but lower than a second load Lo2 (>first load Lo1) and the engine speed is within a medium speed range equal to and higher than a first speed N1 but lower than a second speed N2 (>first speed N1), i.e., the engine load and the engine speed are within an operating range indicated by R12 (hereinafter, referred to as "active $DeNO_x$ execution range R12"). The active $DeNO_x$ execution range R12 is adopted because of the following reason.

As described above, in the case of executing the active $DeNO_x$ control, in view of preventing HC generation caused by the post-injected fuel being discharged as it is, oil dilution by the post-injected fuel, etc., the post injection is performed at the timing so that the fuel is combusted inside the cylinder. In this case, in this embodiment, when the post-injected fuel is combusted, the generation of smoke and also HC (i.e., discharge of unburned fuel due to incomplete combustion) is prevented. For example, the time for the post-injected fuel to combust is extended as long as possible, i.e., ignition is caused in a state where air and fuel are suitably mixed, so that the generation of smoke and HC are prevented. Therefore, in the active $DeNO_x$ control, a suitable amount of EGR gas is introduced to effectively delay the ignition of the post-injected fuel.

Note that the reason for preventing the HC generation during the active $DeNO_x$ control is to prevent that, in the case where the EGR gas is introduced as described above, HC also recirculates to the intake system IN as EGR gas and this HC serves as a binder to combine with soot and clog the gas passage. In addition, when the active $DeNO_x$ control is executed within an operating range within which the temperature of the $NO_x$ catalyst 45 is low and HC purification performance (purification performance of HC due to DOC in the $NO_x$ catalyst 45) is not secured, the HC generation reduction is performed to prevent the HC from being discharged without being purified. The active $DeNO_x$ execution range R12 also includes a range where the temperature of the $NO_x$ catalyst 45 is relatively low and thus cannot secure such HC purification performance.

The reason for preventing smoke generation in the active $DeNO_x$ control is to prevent that, DPF regeneration for combusting and removing PM corresponding to smoke being captured by the DPF 46 (a control of performing post injection similar to the $DeNO_x$ control) is performed frequently and fuel consumption increases.

Incidentally, when the engine load becomes high, since the air introduced into the engine E is reduced to achieve the target air-fuel ratio, the amount of oxygen required for suitable combustion of the post-injected fuel becomes insufficient, and smoke and HC tend to be generated. Especially, as the engine load increases, the in-cylinder temperature rises and the post-injected fuel is ignited without sufficient time from the post injection of the fuel, i.e., combustion occurs before air and fuel are properly mixed, which causes the generation of smoke and HC. On the other hand, within an operating range where the engine load is considerably low, the temperature of the $NO_x$ catalyst 45 is low and the $NO_x$ catalyst 45 does not perform the $NO_x$ reducing function sufficiently. In addition, within this range, the post-injected fuel does not suitably combust, i.e., a misfire occurs.

Although in the above description the phenomenon related to the engine load is described, the same phenomenon occurs with the engine speed.

Thus, in this embodiment, the operating range of the engine E corresponding to the medium load range and the medium speed range is adopted as the active $DeNO_x$ execution range R12 where the active $DeNO_x$ control is executed. In other words, in this embodiment, the active $DeNO_x$ control is executed only within the active $DeNO_x$ execution range R12 and is prohibited outside the active $DeNO_x$ execution range R12. Within the operating range where the active $DeNO_x$ control is prohibited, especially where the engine load or the engine speed is higher than within the active $DeNO_x$ execution range R12 (the range assigned with the reference character "R13"), since the $NO_x$ purification performance of the SCR catalyst 47 is sufficient, the SCR catalyst 47 purifies $NO_x$, and the discharge of $NO_x$ from the vehicle is prevented without executing the $DeNO_x$ control.

Further in this embodiment, within a range where the engine load is higher than the range R13 where the SCR catalyst 47 purifies $NO_x$ (the range assigned with the reference character "R11", hereinafter referred to as "passive $DeNO_x$ execution range R11"), since the amount of exhaust gas increases and the SCR catalyst 47 cannot purify all $NO_x$, the passive $DeNO_x$ control is executed. In this passive $DeNO_x$ control, as described above, the post injection is performed at the timing so that the post-injected fuel is discharged from the cylinder to the exhaust passage 41 as unburned fuel. Within the passive $DeNO_x$ execution range R11, since the temperature of the $NO_x$ catalyst 45 is sufficiently high and suitable purification performance of HC (HC purification performance of the DOC in the $NO_x$ catalyst 45) is secured, the $NO_x$ catalyst 45 properly purifies the unburned fuel discharged as described above.

Note that if the post-injected fuel is combusted inside the cylinder in the passive $DeNO_x$ control as in the active $DeNO_x$ control, smoke is generated. The reason for this is similar to the reason for prohibiting execution of the active $DeNO_x$ control when the engine load becomes high. Therefore, in the passive $DeNO_x$ control, the post-injected fuel is discharged from the cylinder to the exhaust passage 41 as unburned fuel.

Here, a specific example of the active $DeNO_x$ control when the operating state of the engine changes as indicated by the arrow A11 in FIG. 4 is described. First, when the operating state of the engine enters the active $DeNO_x$ execution range R12 (see the area indicated by the reference character "A12"), the PCM 60 executes the active $DeNO_x$ control. Then, when the operating state of the engine reaches outside the active $DeNO_x$ execution range R12 (see the area indicated by the reference character "A13"), the PCM 60 suspends the active $DeNO_x$ control, and the SCR catalyst 47 purifies $NO_x$. When the operating state of the engine re-enters the active $DeNO_x$ execution range R12 (see the area indicated by the reference character "A14"), the PCM 60 resumes the active $DeNO_x$ control. In this manner, the active $DeNO_x$ control is carried on until $NO_x$ stored in the $NO_x$ catalyst 45 drops almost down to zero.

Next, the temperature ranges within which the passive $DeNO_x$ control and the active $DeNO_x$ control are executed in this embodiment are described. Typically, the $NO_x$ catalyst 45 exerts the $NO_x$ purification performance within a comparatively low temperature range, and the SCR catalyst 47 exerts $NO_x$ purification performance within a comparatively high temperature range, e.g., higher than the range where the $NO_x$ catalyst 45 exerts the $NO_x$ purification performance. In this embodiment, the temperature close to a lowest value within the temperature range where the $NO_x$ purification rate higher than a given value is obtainable by the SCR catalyst 47 is used as a determination temperature (hereinafter, referred to as "SCR determination temperature"). The passive $DeNO_x$ control or the active $DeNO_x$ control is executed only when the temperature of the SCR catalyst 47 (hereinafter, referred to as "SCR temperature") is below the SCR determination temperature. If the SCR temperature is above the SCR determination temperature, the $NH_3$-supplied $DeNO_x$ control is executed.

Figure 5:
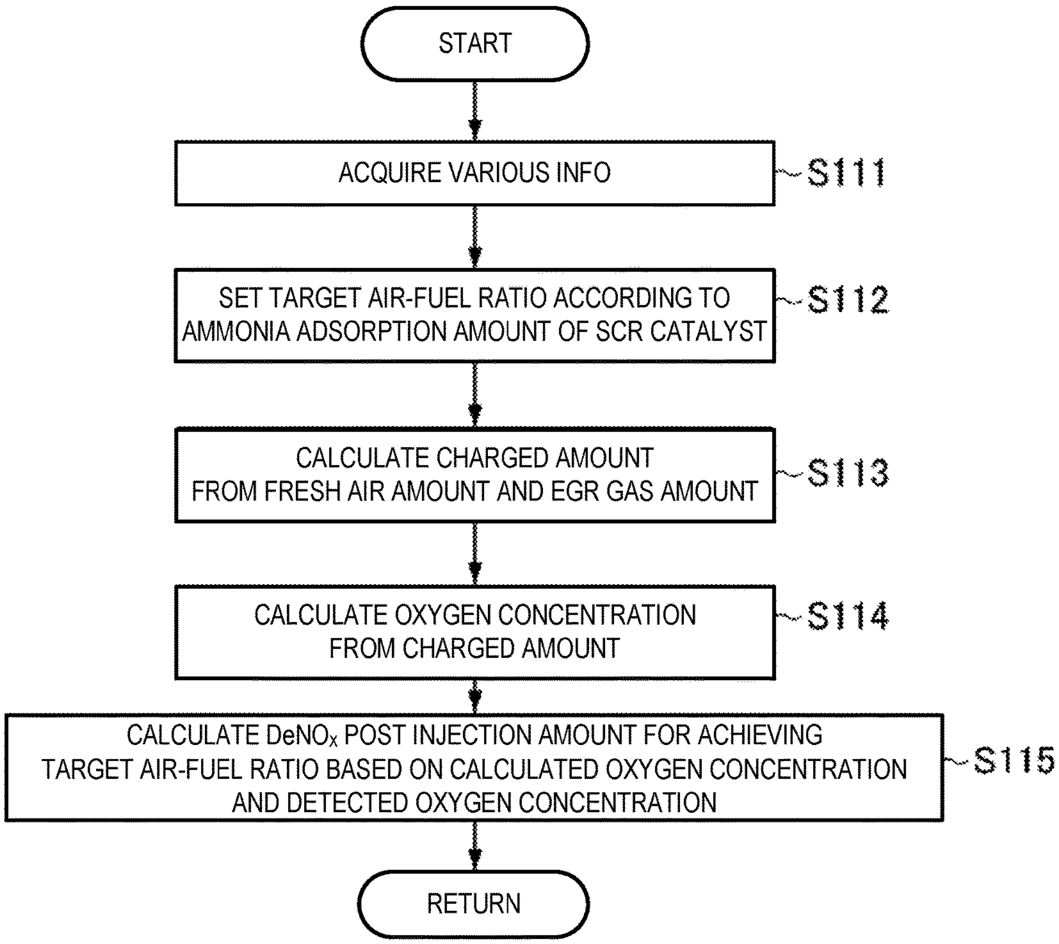
FIG. 5 is a flowchart illustrating a $DeNO_x$ post injection amount calculation of the embodiment.

Next, a method of calculating the post injection amount applied in the $DeNO_x$ control (hereinafter, referred to as "$DeNO_x$ post injection amount") in this embodiment is described with reference to the flowchart (hereinafter, referred to as "$DeNO_x$ post injection amount calculation process") of FIG. 5. The PCM 60 repeatedly executes the $DeNO_x$ post injection amount calculation process at a given cycle in parallel with the fuel injection control process illustrated in FIG. 3. In other words, the $DeNO_x$ post injection amount is calculated as needed during the fuel injection control. The $DeNO_x$ post injection amount includes the post injection amount for the $NH_3$-supplied $DeNO_x$ control.

First, at S111, the PCM 60 acquires the operating state of the engine E. For example, the PCM 60 at least acquires the intake air amount (fresh air amount) detected by the airflow sensor 101, the oxygen concentration within the exhaust gas detected by the $O_2$ sensor 111, and the main injection amount calculated at S104 of FIG. 3. The PCM 60 also acquires an exhaust gas amount (EGR gas amount) recirculated to the intake system IN by the EGR device 43, which is obtained based on a given model, and also an ammonia adsorption amount which is an amount of ammonia adsorbed by the SCR catalyst 47. Here, the PCM 60 acquires an estimated ammonia adsorption amount. The method of estimating the ammonia adsorption amount is described later in detail.

Next, at S112, the PCM 60 sets a target air-fuel ratio applied for reducing $NO_x$ stored in the $NO_x$ catalyst 45 based on the ammonia adsorption amount in the SCR catalyst 47 acquired at S111. For example, the PCM 60 sets a target air-fuel ratio applied when executing the active $DeNO_x$ control, a target air-fuel ratio applied when executing the passive $DeNO_x$ control, and a target air-fuel ratio applied when executing the $NH_3$-supplied $DeNO_x$ control, based on the ammonia adsorption amount in the SCR catalyst 47. A method of setting the target air-fuel ratios is described in detail with reference to FIG. 6.

Figure 6:
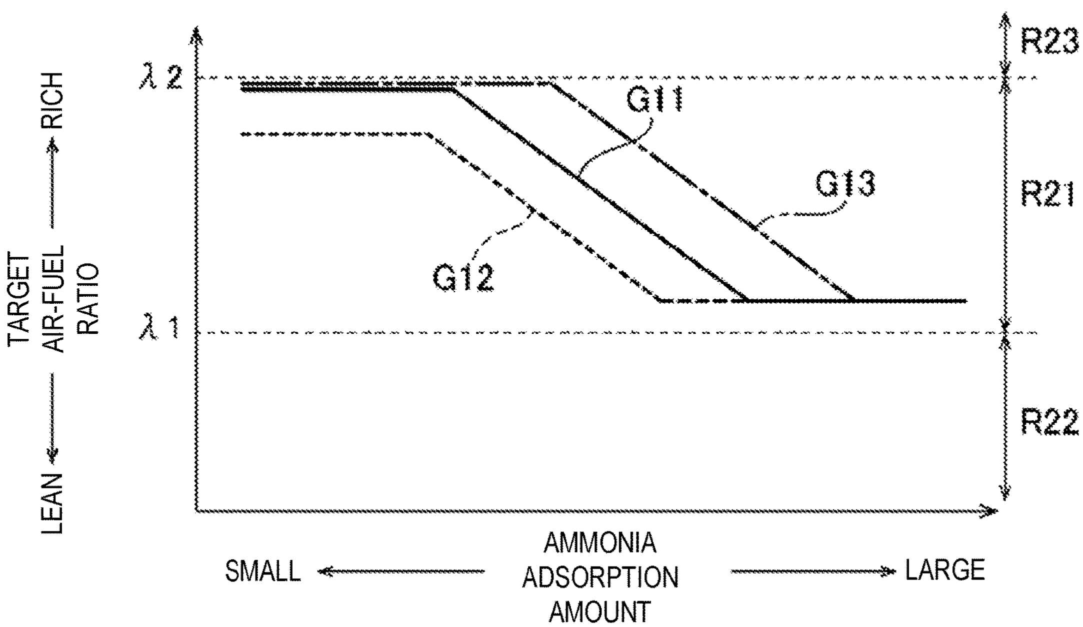
FIG. 6 is a chart illustrating a setting method of a target air-fuel ratio of the embodiment.

In FIG. 6, the horizontal axis indicates the ammonia adsorption amount in the SCR catalyst 47, and the vertical axis indicates the target air-fuel ratio.

In FIG. 6, "λ1" indicates the theoretical air-fuel ratio, the range R21 on the richer side of the theoretical air-fuel ratio λ1 indicates the air-fuel ratio range where the $NO_x$ stored in the $NO_x$ catalyst 45 is reducible, and the range R22 on the leaner side of the theoretical air-fuel ratio λ1 indicates the air-fuel ratio range where the $NO_x$ stored in the $NO_x$ catalyst 45 is not reducible. Further, the range R23 on the richer side of a limit air-fuel ratio λ2 is set so that the target air-fuel ratio, e.g., a second target air-fuel ratio in the graph G13 (described later), is not set within the range R23, exceeding the limit air-fuel ratio λ2, in order to prevent lowering the reliability of the EGR device 43 due to the supply of unburned fuel to the EGR device 43. The graph G11 indicates the target air-fuel ratio to be set according to the ammonia adsorption amount of the SCR catalyst 47 when executing the passive $DeNO_x$ control, and the graph G12 indicates the target air-fuel ratio to be set according to the ammonia adsorption amount of the SCR catalyst 47 when executing the active $DeNO_x$ control (first target air-fuel ratio). The graph G13 indicates the target air-fuel ratio to be set according to the ammonia adsorption amount of the SCR catalyst 47 when executing the $NH_3$-supplied $DeNO_x$ control (second target air-fuel ratio). These graphs G11, G12 and G13 correspond to a map defining the target air-fuel ratio to be set according to the ammonia adsorption amount.

Typically, if the target air-fuel ratio is set at the rich side within the range R21, the amounts of HC and $H_2O$ supplied to the $NO_x$ catalyst 45, that is, the total amount of "H" component is increased and the generation of $NH_3$ in the $NO_x$ catalyst 45 increases. In other words, when the target air-fuel ratio is set at the rich side within the range R21, in the case of discharging the unburned fuel into the exhaust gas by setting the post injection timing, HC and CO, etc. in the exhaust gas increase, or in the case of achieving the in-cylinder combustion of the post-injected fuel by setting the post injection timing, $H_2O$ and $CO_2$, etc. in the exhaust gas increase so that the total amount of "H" component in the exhaust gas increases and the amount of $NH_3$ generated in the $NO_x$ catalyst 45 also increases.

In consideration of this, in this embodiment, as illustrated in the graph G13, the target air-fuel ratio in the case of executing the $NH_3$-supplied $DeNO_x$ control is set richer than the target air-fuel ratio in the case of executing the active $DeNO_x$ control. In the $NH_3$-supplied $DeNO_x$ control, the total amount of "H" component supplied to the $NO_x$ catalyst 45 is increased, the amount of $NH_3$ generated in the $NO_x$ catalyst 45 becomes easier to increase, and thus the amount of $NH_3$ generated in the $NO_x$ catalyst 45 increases.

In the graph G13, when the ammonia adsorption amount of the SCR catalyst 47 is comparatively small, the rich side of the target air-fuel ratio of the $NH_3$-supplied $DeNO_x$ control is set to a value close to the limit air-fuel ratio λ2 so that the total amount of "H" component in the exhaust gas increases and the $NH_3$ generation amount in the $NO_x$ catalyst 45 increases. On the other hand, in the graph G13, when the ammonia adsorption amount of the SCR catalyst 47 is comparatively large, the target air-fuel ratio of the $NH_3$-supplied $DeNO_x$ control is set to a value comparatively close to the theoretical air-fuel ratio within the rich-side range R21 corresponding to a lacking amount to a target adsorption amount of the ammonia adsorption amount of the SCR catalyst 47. By setting the target air-fuel ratio of the $NH_3$-supplied $DeNO_x$ control to approach the theoretical air-fuel ratio (approaches the lowest (leanest) value within the range R21) as the ammonia adsorption amount of the SCR catalyst 47 increases, the $NO_x$ catalyst 45 generates $NH_3$ by an amount corresponding to the lacking amount to the target adsorption amount of the ammonia adsorption amount of the SCR catalyst 47. Moreover, it is prevented that $NH_3$ generated in the $NO_x$ catalyst 45 by the $NH_3$-supplied $DeNO_x$ control is not sufficiently adsorbed by the SCR catalyst 47 and is released.

On the other hand, as illustrated in the graph G12, the target air-fuel ratio of the active $DeNO_x$ control is set so that the fuel injector 20 is controlled to perform the post injection so as to continuously control the air-fuel ratio to the target air-fuel ratio which is approximately equal to or smaller than a theoretical air-fuel ratio, in order to reduce $NO_x$ stored in the $NO_x$ catalyst 45 to substantially zero. Therefore, under the condition that the active $DeNO_x$ control is executed (the condition, such as the temperature of the $NO_x$ catalyst 45), since the $NO_x$ catalyst 45 performs the $NO_x$ purification and the SCR catalyst 47 does not perform the $NO_x$ purification using $NH_3$, in the active $DeNO_x$ control, the target air-fuel ratio is set without considering to intentionally generate $NH_3$ in the $NO_x$ catalyst 45. Further in the active $DeNO_x$ control, due to the execution condition, etc., even if $NH_3$ is generated in the $NO_x$ catalyst 45, the amount is comparatively small.

Further, as illustrated in the graph G11, the target air-fuel ratio of the passive $DeNO_x$ control is set so that when the air-fuel ratio becomes rich due to acceleration of the vehicle, the fuel injector 20 is controlled to perform the post injection so as to temporarily control the air-fuel ratio to the target air-fuel ratio, in order to reduce $NO_x$ stored in the $NO_x$ catalyst 45. Therefore, under the condition that the passive $DeNO_x$ control is executed (the condition, such as the temperature of the $NO_x$ catalyst), since the $NO_x$ catalyst 45 performs the $NO_x$ purification and the SCR catalyst 47 does not perform the $NO_x$ purification using $NH_3$, in the passive $DeNO_x$ control, the target air-fuel ratio is set without considering to intentionally generate $NH_3$ in the $NO_x$ catalyst 45. Further in the passive $DeNO_x$ control, due to the execution condition etc., even if $NH_3$ is generated in the $NO_x$ catalyst 45, the amount is comparatively small.

Here, a method of estimating the ammonia adsorption amount of the SCR catalyst 47 in this embodiment is briefly described. This ammonia adsorption amount estimation method is executed by the PCM 60.

First, the PCM 60 obtains the ammonia supply amount per unit time supplied to the SCR catalyst 47 by the urea injection by the urea injector 51 based on the exhaust gas state (e.g., the exhaust gas amount and the exhaust gas temperature), and the state of the SCR catalyst 47 (e.g., the SCR temperature). Further, the PCM 60 obtains the ammonia generation amount per unit time generated in the $NO_x$ catalyst 45 during the $DeNO_x$ control, based on the operating state of the engine E and the state of the $NO_x$ catalyst 45 (e.g., the $NO_x$ catalyst temperature and the $NO_x$ stored amount). Further, the PCM 60 obtains the consumed amount of ammonia per unit time by reducing and purifying $NO_x$ in the SCR catalyst 47 based on the exhaust gas state (e.g., the exhaust gas amount, the exhaust gas temperature, and the $NO_x$ concentration in the exhaust gas), and the state of the SCR catalyst 47 (e.g., the SCR temperature).

Then, the PCM 60 obtains the ammonia adsorption change amount per unit time (amount of change in the ammonia adsorption amount) in the SCR catalyst 47 based on the ammonia supply amount, the ammonia generation amount, and the ammonia consumption amount. For example, the PCM 60 obtains the ammonia adsorption change amount per unit of time based on "ammonia supply amount+ammonia generation amount−ammonia consumption amount." Further, the PCM 60 applies the obtained ammonia adsorption change amount to the current ammonia adsorption amount, that is, the previously-estimated ammonia adsorption amount, to obtain the latest ammonia adsorption amount. For example, when the ammonia adsorption change amount is a positive value, the PCM 60 adds the ammonia adsorption change amount to the previously-estimated ammonia adsorption amount to obtain the latest ammonia adsorption amount (here, the ammonia adsorption amount increases). When the ammonia adsorption change amount is a negative value, the PCM 60 subtracts the ammonia adsorption change amount from the previously-estimated ammonia adsorption amount to obtain the latest ammonia adsorption amount (here, the ammonia adsorption amount reduces).

Note that although the example in which the ammonia adsorption amount of the SCR catalyst 47 is estimated is described above, in another example, the ammonia adsorption amount of the SCR catalyst 47 may be detected using a given sensor.

Returning to FIG. 5, the process after S113 is described. At S113, the PCM 60 calculates the air amount (that is, the charged amount) introduced into the engine E based on the fresh air amount and the EGR gas amount acquired at S111. At S114, the PCM 60 calculates the oxygen concentration within the air introduced into the engine E based on the charging amount calculated at S113.

Next, at S115, the PCM 60 calculates the post injection amount (DeNO$_x$ post injection amount) required in achieving the target air-fuel ratio set at S112. In other words, the PCM 60 determines the post injection amount required in addition to the main injection amount in order to bring the air-fuel ratio of the exhaust gas to the target air-fuel ratio. In this case, the PCM 60 calculates the post injection amount for achieving the target air-fuel ratio when executing the active DeNO$_x$ control set at S112, the post injection amount for achieving the target air-fuel ratio when executing the passive DeNO$_x$ control set at S112, and the post injection amount for achieving the target air-fuel ratio when executing the $NH_3$-supplied DeNO$_x$ control set at S112.

For example, the PCM 60 calculates the DeNO$_x$ post injection amount in consideration of the difference between the oxygen concentration (the oxygen concentration detected by the 02 sensor 111) acquired at S111 and the oxygen concentration calculated at S114. More specifically, based on the air-fuel ratio of the exhaust gas generated when the fuel injected in the main injection is combusted, the PCM 60 suitably performs feedback processing according to the difference between the detected oxygen concentration and the calculated oxygen concentration, and calculates the DeNO$_x$ post injection amount for controlling the air-fuel ratio to the target air-fuel ratio. By calculating the DeNO$_x$ post injection amount as described above, the air-fuel ratio is accurately controlled to the target air-fuel ratio by the post injection in the DeNO$_x$ control, and the NO$_x$ stored in the NO$_x$ catalyst 45 is reliably reduced.

Hereinafter, the active DeNO$_x$ control, the passive DeNO$_x$ control, and the $NH_3$-supplied DeNO$_x$ control of this embodiment are described in detail.

Figure 7:
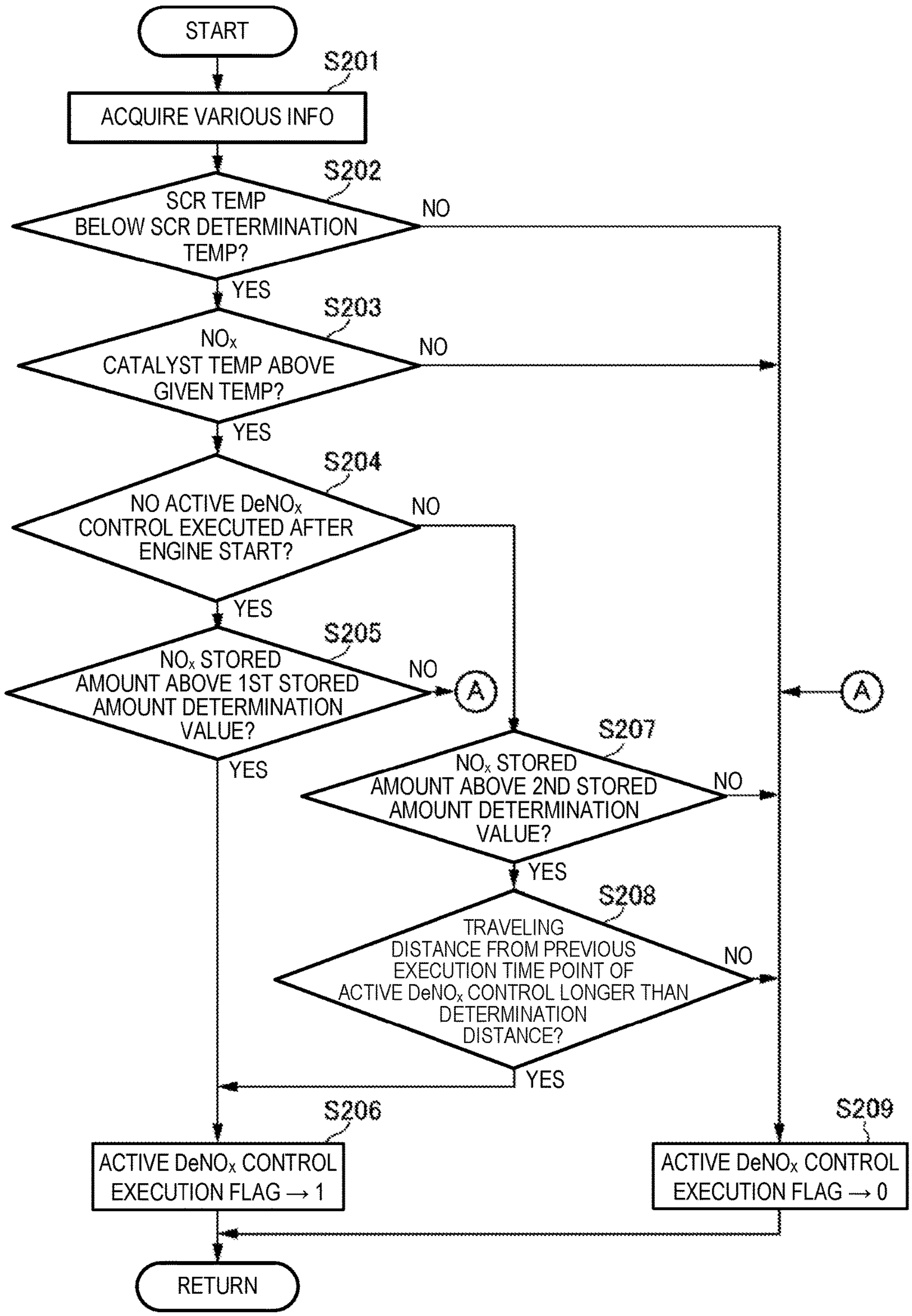
FIG. 7 is a flowchart illustrating setting of an active $DeNO_x$ control execution flag of the embodiment.

First, setting of an active DeNO$_x$ control execution flag which is for determining whether to execute the active DeNO$_x$ control in this embodiment is described with reference to the flowchart (active DeNO$_x$ control execution flag setting process) of FIG. 7. The PCM 60 repeatedly executes this active DeNO$_x$ control execution flag setting process at a given cycle in parallel with the fuel injection control process illustrated in FIG. 3.

First, at S201, the PCM 60 acquires various information of the vehicle. For example, the PCM 60 acquires at least a NO$_x$ catalyst temperature, the SCR temperature, and the NO$_x$ stored amount in the NO$_x$ catalyst 45. Here, the NO$_x$ catalyst temperature is estimated, for example, based on the temperature detected by the temperature sensor 112 disposed immediately upstream of the NO$_x$ catalyst 45 (the temperature detected by the temperature sensor 113 disposed between the NO$_x$ catalyst 45 and the DPF 46 may also be used). The SCR temperature is estimated based on, for example, the temperature detected by the temperature sensor 117 disposed immediately upstream of the SCR catalyst 47. The NO$_x$ stored amount is obtained by estimating the amounts of NO$_x$ within the exhaust gas based on the operating state of the engine E, the flow rate of the exhaust gas, the temperature of the exhaust gas, etc., and integrating the NO$_x$ amounts.

Next, at S202, the PCM 60 determines whether the SCR temperature acquired at S201 is below an SCR determination temperature. If the SCR temperature is below the SCR determination temperature (S202: YES), the process proceeds to S203. On the other hand, if the SCR temperature is above the SCR determination temperature (S202: NO), the process proceeds to S209. In this case, since the SCR catalyst 47 suitably purifies NO$_x$ within the exhaust gas, the PCM 60 sets the active DeNO$_x$ control execution flag to "0" to prohibit execution of the active DeNO$_x$ control (S209). Then, the process ends.

At S203, the PCM 60 determines whether the NO$_x$ catalyst temperature acquired at S201 is above a given temperature. When the NO$_x$ catalyst temperature is low, even if the air-fuel ratio is controlled to the target air-fuel ratio, the NO$_x$ catalyst 45 hardly reduces the stored NO$_x$. Therefore, at S203, whether the NO$_x$ stored in the NO$_x$ catalyst 45 is reducible is determined. The given temperature used in the determination of S203 is set based on the NO$_x$ catalyst temperature at which the NO$_x$ stored in the NO$_x$ catalyst 45 is reducible. If the NO$_x$ catalyst temperature is above the given temperature (S203: YES), the process proceeds to S204. On the other hand, when the NO$_x$ catalyst temperature is below the given temperature (S203: NO), the process proceeds to S209. In this case, the PCM 60 sets the active DeNO$_x$ control execution flag to "0" to prohibit execution of the active DeNO$_x$ control (S209).

At S204, the PCM 60 determines whether the active DeNO$_x$ control has been executed even once after an engine start. The determination of S204 is performed so that if the active DeNO$_x$ control has not been executed after the engine start, the execution condition of the active DeNO$_x$ control is loosened compared to the case where the active DeNO$_x$ control has been executed, so as to preferentially execute the active DeNO$_x$ control. For example, if the active DeNO$_x$ control has been executed, the execution condition of S207 and the execution condition of S208, which are comparatively strict, are used, whereas if the active DeNO$_x$ control has not been executed, only the execution condition of S205 which is comparatively loose is used (these are described later in detail). If the active DeNO$_x$ control has not been executed (S204: YES), the process proceeds to S205.

At S205, the PCM 60 determines whether the NO$_x$ stored amount acquired at S201 is above a first stored amount determination value. For example, the first stored amount determination value is set to a value somewhat lower than the limit value of the NO$_x$ stored amount. If the NO$_x$ stored amount is above the first stored amount determination value (S205: YES), the process proceeds to S206. In this case, the PCM 60 sets the active DeNO$_x$ control execution flag to "1" to permit execution of the active DeNO$_x$ control (S206). In this manner, by executing the active DeNO$_x$ control after the engine start to somewhat forcibly reduce the NO$_x$ stored in the NO$_x$ catalyst 45, the NO$_x$ purification performance of the NO$_x$ catalyst 45 is reliably secured. On the other hand, when the NO$_x$ stored amount is smaller than the first stored amount determination value (S205: NO), the process proceeds to S209. In this case, the PCM 60 sets the active DeNO$_x$ control execution flag to "0" to prohibit unnecessary execution of the active DeNO$_x$ control (S209). Then, the process ends.

On the other hand, if the active DeNO$_x$ control has been executed after the engine start (S204: NO), the process proceeds to S207 where the PCM 60 determines whether the NO$_x$ stored amount acquired at S201 is above a second stored amount determination value. The second stored amount determination value is applied as a value at least higher than the first stored amount determination value, for example, the second stored amount determination value is set to a value close to (such as two-third of) the limit value of the $NO_x$ stored amount. If the $NO_x$ stored amount is above the second stored amount determination value (S207: YES), the process proceeds to S208. On the other hand, if the $NO_x$ stored amount is smaller than the second stored amount determination value (S207: NO), the process proceeds to S209. In this case, the PCM 60 sets the active $DeNO_x$ control execution flag to "0" to prohibit unnecessary execution of the active $DeNO_x$ control (S209). Then, the process ends.

At S208, the PCM 60 determines whether a traveling distance of the vehicle from the previous execution time point of the active $DeNO_x$ control is longer than a given determination distance. If this traveling distance is longer than the determination distance (S208: YES), the process proceeds to S206. In this case, the PCM 60 sets the active $DeNO_x$ control execution flag to "1" to permit execution of the active $DeNO_x$ control (S206). By doing so, the active $DeNO_x$ control is executed to forcibly reduce a large amount of $NO_x$ stored in the $NO_x$ catalyst 45, thus the $NO_x$ purification performance of the $NO_x$ catalyst 45 is reliably secured. On the other hand, if the traveling distance is less than the determination distance (S208: NO), the process proceeds to S209. In this case, the PCM 60 sets the active $DeNO_x$ control execution flag to "0" to prohibit execution of the active $DeNO_x$ control (S209). Then, the process ends.

When the active $DeNO_x$ control is executed in a situation where the traveling distance from the previous execution time point of the active $DeNO_x$ control is short (i.e., the execution interval of the active $DeNO_x$ control is short), the possibility of oil dilution due to the post injection occurring becomes high. Therefore, in this embodiment, when this traveling distance is shorter than the determination distance (S208: NO), execution of the active $DeNO_x$ control is prohibited and oil dilution due to the post injection in the active $DeNO_x$ control is prevented. On the other hand, if the traveling distance from the previous execution time point of the active $DeNO_x$ control is long (i.e. the execution interval of the active $DeNO_x$ control is long), even if the active $DeNO_x$ control is to be executed, the possibility of oil dilution occurring due to the post injection is low. Therefore, in this embodiment, when the traveling distance from the previous execution time point of the active $DeNO_x$ control is longer than the determination distance (S208: YES), execution of the active $DeNO_x$ control is permitted.

Further in this embodiment, in consideration of progression in vaporization of post-injected fuel and oil dilution being less likely to occur as the in-cylinder temperature rises, the determination distance used at S208 is set small as the in-cylinder temperature rises to loosen the limitation on the control corresponding to the traveling distance from the previous execution time point of the active $DeNO_x$ control.

Next, setting of a passive $DeNO_x$ control execution flag which is for determining whether to execute the passive $DeNO_x$ control in this embodiment is described with reference to the flowchart (passive $DeNO_x$ control execution flag setting process) of FIG. 8. The PCM 60 repeatedly executes this passive $DeNO_x$ control execution flag setting process at a given cycle in parallel with the fuel injection control process illustrated in FIG. 3 and the active $DeNO_x$ control execution flag setting process illustrated in FIG. 7.

First, at S301, the PCM 60 acquires various information of the vehicle. For example, the PCM 60 acquires at least the $NO_x$ catalyst temperature, the SCR temperature, the target torque determined in the fuel injection control process illustrated in FIG. 3, the $DeNO_x$ post injection amount calculated in the $DeNO_x$ post injection amount calculation process illustrated in FIG. 5 (specifically, the $DeNO_x$ post injection amount calculated to be applied in the passive $DeNO_x$ control), the $NO_x$ stored amount in the $NO_x$ catalyst 45, and the value of the active $DeNO_x$ control execution flag set in the active $DeNO_x$ control execution flag setting process illustrated in FIG. 7. Note that the method of obtaining the $NO_x$ catalyst temperature, the SCR temperature, and the $NO_x$ stored amount is as described above.

At S301, the PCM 60 also acquires the execution frequency of the passive $DeNO_x$ control within a given period. For example, the PCM 60 acquires the number of times the passive $DeNO_x$ control is executed within a given period (e.g., several seconds or several minutes) as the execution frequency of the passive $DeNO_x$ control.

Next, at S302, the PCM 60 determines whether the SCR temperature acquired at S301 is below the SCR determination temperature. If the SCR temperature is below the SCR determination temperature (S302: YES), the process proceeds to S303. On the other hand, if the SCR temperature is above the SCR determination temperature (S302: NO), the process proceeds to S308. In this case, since the SCR catalyst 47 suitably purifies $NO_x$ within the exhaust gas, the PCM 60 sets the passive $DeNO_x$ control execution flag to "0" to prohibit execution of the passive $DeNO_x$ control (S308). Then, the process ends.

Next, at S303, the PCM 60 determines whether the execution frequency of the passive $DeNO_x$ control acquired at S301 is below a given frequency determination value. If the execution frequency is below the frequency determination value (S303: YES), the process proceeds to S304. On the other hand, if the execution frequency is above the frequency determination value (S303: NO), the process proceeds to S308. In this case, the PCM 60 sets the passive $DeNO_x$ control execution flag to "0" to prohibit execution of the passive $DeNO_x$ control (S308).

If the passive $DeNO_x$ control is executed in a situation where the passive $DeNO_x$ control has been carried out comparatively frequently, there is a high possibility that oil dilution occurs due to the post injection. Therefore, in this embodiment, when the execution frequency of the passive $DeNO_x$ control is above the frequency determination value (S303: NO), execution of the passive $DeNO_x$ control is prohibited so as to prevent oil dilution due to the post injection of the passive $DeNO_x$ control. On the other hand, in a situation where the passive $DeNO_x$ control has hardly been carried out (i.e., the execution frequency of the passive $DeNO_x$ control is comparatively low), even if the passive $DeNO_x$ control is executed, the possibility of oil dilution occurring due to the post injection is low. Therefore, in this embodiment, when the execution frequency of the passive $DeNO_x$ control is below the frequency determination value (S303: YES), execution of the passive $DeNO_x$ control is allowed.

In this embodiment, the frequency determination value used at S303 is set higher as the in-cylinder temperature rises. When the frequency determination value is high, there is a higher possibility that the execution frequency of the passive $DeNO_x$ control becomes less than the frequency determination value (S303: YES) than when the frequency determination value is low. Therefore, in this embodiment, the limitation on the control corresponding to the execution frequency of the passive $DeNO_x$ control is loosened as the in-cylinder temperature rises. This is because vaporization of the post-injected fuel progresses and oil dilution becomes less likely to occur as the in-cylinder temperature rises.

Next, at S304, whether the $NO_x$ stored amount acquired at S301 is above a third stored amount determination value. For example, the third stored amount determination value is set to a value of about one-third of the limit value of the $NO_x$ stored amount. If the $NO_x$ stored amount is above the third stored amount determination value (S304: YES), the process proceeds to S305. On the other hand, if the $NO_x$ stored amount is below the third stored amount determination value (S304: NO), the process proceeds to S308. In this case, the PCM 60 sets the passive $DeNO_x$ control execution flag to "0" (S308) so as to prohibit unnecessary execution of the passive $DeNO_x$ control and prevent the fuel consumption increase caused by the passive $DeNO_x$ control. Then, the process ends.

At S305, the PCM 60 determines whether the active $DeNO_x$ control execution flag acquired at S301 is "0." In other words, the PCM 60 determines whether to execute the active $DeNO_x$ control. If the active $DeNO_x$ control execution flag is "0" (S305: YES), the process proceeds to S306. On the other hand, if the active $DeNO_x$ control execution flag is not "0," i.e., if it is "1" (S305: NO), the process proceeds to S308. In this case, the PCM 60 sets the passive $DeNO_x$ control execution flag to "0" to prohibit execution of the passive $DeNO_x$ control and preferentially executes the active $DeNO_x$ control (S308). In other words, even if the execution condition of the passive $DeNO_x$ control is satisfied, when the execution condition of the active $DeNO_x$ control is satisfied, the active $DeNO_x$ control is preferentially executed. Then, the process ends.

At S306, the PCM 60 determines whether the $DeNO_x$ post injection amount acquired at S301 is smaller than a first post injection amount determination value. In other words, whether the air-fuel ratio drops to a given value on the rich side in the current situation, i.e., whether the vehicle is in a given acceleration state. In this manner, whether the $DeNO_x$ control is executable while preventing the fuel consumption increase as much as possible is determined and whether there is a possibility of oil dilution occurring due to the post injection is determined. The first post injection amount determination value to be applied for the determination at S306 is set in view of the above.

If the $DeNO_x$ post injection amount is smaller than the first post injection amount determination value (S306: YES), the process proceeds to S307. In this case, the conditions of S302 to S306 described above are all satisfied, the PCM 60 sets the passive $DeNO_x$ control execution flag to "1" to permit execution of the passive $DeNO_x$ control (S307). Then, the process ends. On the other hand, if the $DeNO_x$ post injection amount is above the first post injection amount determination value (S306: NO), the process proceeds to S308. In this case, the PCM 60 sets the passive $DeNO_x$ control execution flag to "0" to prohibit execution of the passive $DeNO_x$ control and prevent the fuel consumption increase and oil dilution (S308). Then, the process ends.

Figure 9:
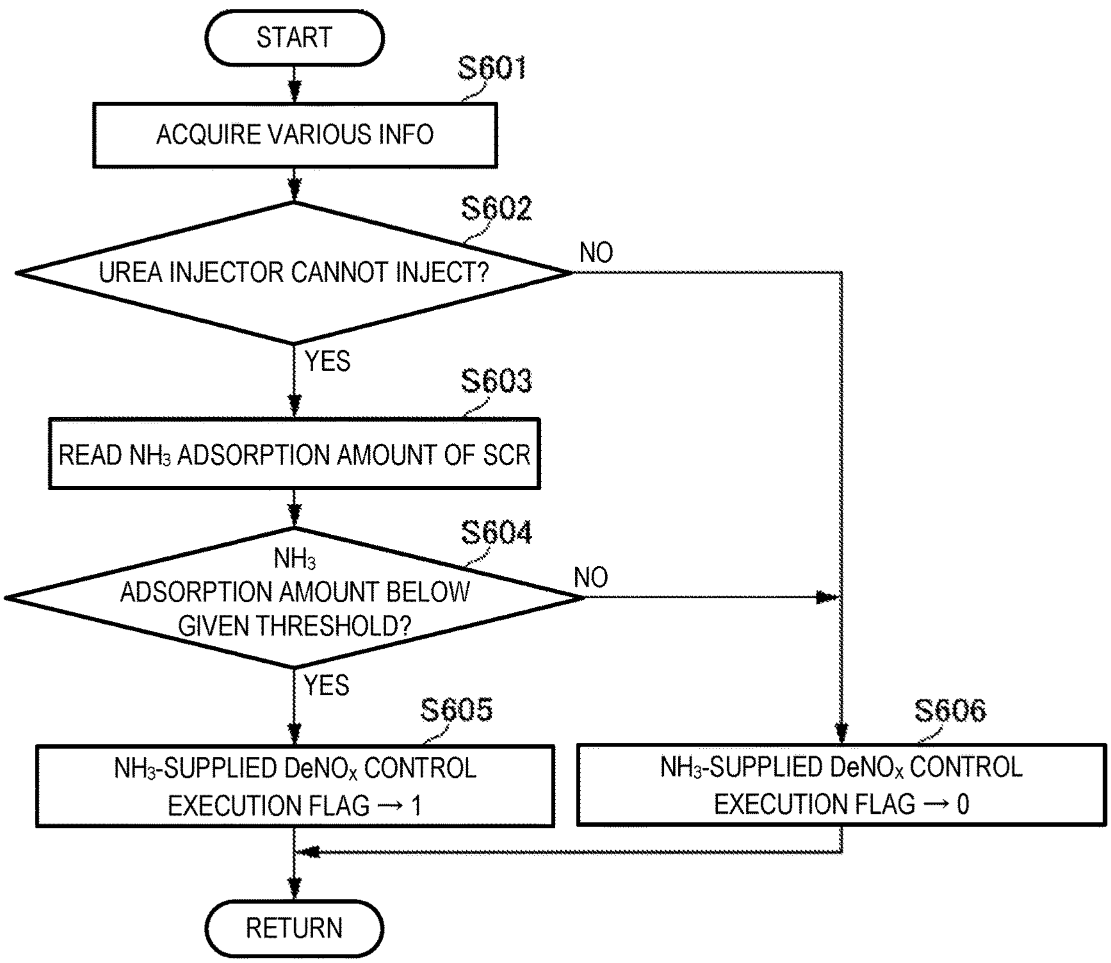
FIG. 9 is a flowchart illustrating setting of an $NH_3$-supplied $DeNO_x$ control execution flag of the embodiment.

Next, setting of an $NH_3$-supplied $DeNO_x$ control execution flag used for determining whether to execute the $NH_3$-supplied $DeNO_x$ control in this embodiment is described with reference to the flowchart ($NH_3$-supplied $DeNO_x$ control execution flag setting process) of FIG. 9. The PCM 60 repeatedly executes this $NH_3$-supplied $DeNO_x$ control execution flag setting process at a given cycle in parallel with the fuel injection control process illustrated in FIG. 3, etc.

First, at S601, the PCM 60 acquires from the DCU 70 various information of the vehicle and various information of the system for injecting urea from the urea injector 51 to the SCR catalyst 47. For example, the PCM 60 acquires at least the information related to the outdoor temperature of the vehicle and freezing of urea inside the urea tank 55. The information related to freezing of urea inside the urea tank 55 is, for example, the temperature of urea inside the urea tank 55, and the temperature of urea is measured or estimated based on the temperature detected by the urea temperature sensor 59 provided to the urea tank 55.

Next, at S602, the PCM 60 determines whether urea inside the urea tank 55 is normally injectable from the urea injector 51. For example, the PCM 60 determines whether urea is frozen inside the urea tank 55 based on the outdoor temperature of the vehicle or the temperature of urea inside the urea tank 55. When it is determined that urea is frozen inside the urea tank 55, the PCM 60 starts the urea path heater 57 and the urea tank heater 61 to start heating urea. The urea path heater 57 and the urea tank heater 61 keep heating urea until urea melts inside the urea tank 55 and normally injectable from the urea injector 51.

Meanwhile, if the urea cannot be normally injected from the urea injector 51 (S602: YES), the process proceeds to S603. At S602, examples of the case where urea cannot be normally injected from the urea injector 51 include a case where the urea is completely or partially frozen inside the urea tank 55 and urea cannot be injected from the urea injector 51, a case where the urea tank 55 is empty, a case where the actual urea injection amount from the urea injector 51 is smaller than the urea injection amount from the urea injector 51 calculated by the PCM 60, and a case where the urea supply path 53 or the urea sending pump 54 which supply urea from the urea tank 55 to the urea injector 51 is broken and cannot supply urea. On the other hand, if urea is injectable from the urea injector 51 (S602: NO), the process proceeds to S606. In this case, since the SCR catalyst 47 suitably purifies $NO_x$ in the exhaust gas, the PCM 60 sets the $NH_3$-supplied $DeNO_x$ control execution flag to "0" so as to prohibit execution of the $NH_3$-supplied $DeNO_x$ control (S606), and the process ends.

Note that at S602, as another example for determining whether urea inside the urea tank 55 is normally injectable from the urea injector 51, the urea supply path pressure sensor 56 provided in the urea supply path 53 may determine whether the urea injection by the urea injector 51 is not normally performed, by detecting a pressure change when urea passes through the urea supply path 53. In this case, when the urea supply path pressure sensor 56 detects no pressure change caused by the urea flowing on the urea supply path 53 (S602: YES), the urea injection by the urea injector 51 is determined as not normally performed, and the process proceeds to S603. If the urea supply path pressure sensor 56 detects the pressure change caused by the urea flowing on the urea supply path 53 (S602: NO), the process proceeds to S606. In this case, since the SCR catalyst 47 suitably purifies $NO_x$ in the exhaust gas, the PCM 60 sets the $NH_3$-supplied $DeNO_x$ control execution flag to "0" so as to prohibit execution of the $NH_3$-supplied $DeNO_x$ control (S606), and the process ends.

If urea cannot be injected from the urea injector 51, the PCM 60 activates the urea tank heater 61 to heat up and melt frozen urea inside the urea tank 55. When urea thus becomes injectable from the urea injector 51, the process proceeds to S606.

Next, at S603, the PCM 60 acquires an estimated value of the amount of $NH_3$ adsorbed by the SCR catalyst 47, and proceeds to S604.

Next, at S604, the PCM 60 determines whether the estimated value of the $NH_3$ adsorption amount in the SCR catalyst 47 is below a given threshold.

If the estimated value of the $NH_3$ adsorption amount is below a given threshold (S604: YES), the process proceeds to S605. In this case, since all the conditions at S602 to S604 are satisfied, the PCM 60 sets the $NH_3$-supplied $DeNO_x$ control execution flag to "1" so as to permit execution of the $NH_3$-supplied $DeNO_x$ control (S605). Then, the process ends.

On the other hand, if the estimated value of the adsorption amount of $NH_3$ is above the given threshold (S604: NO), the process proceeds to S606. In this case, since the SCR catalyst 47 suitably purifies $NO_x$ in the exhaust gas, the PCM 60 sets the $NH_3$-supplied $DeNO_x$ control execution flag to "0" so as to prohibit execution of the $NH_3$-supplied $DeNO_x$ control (S606), and the process ends.

Figure 10:
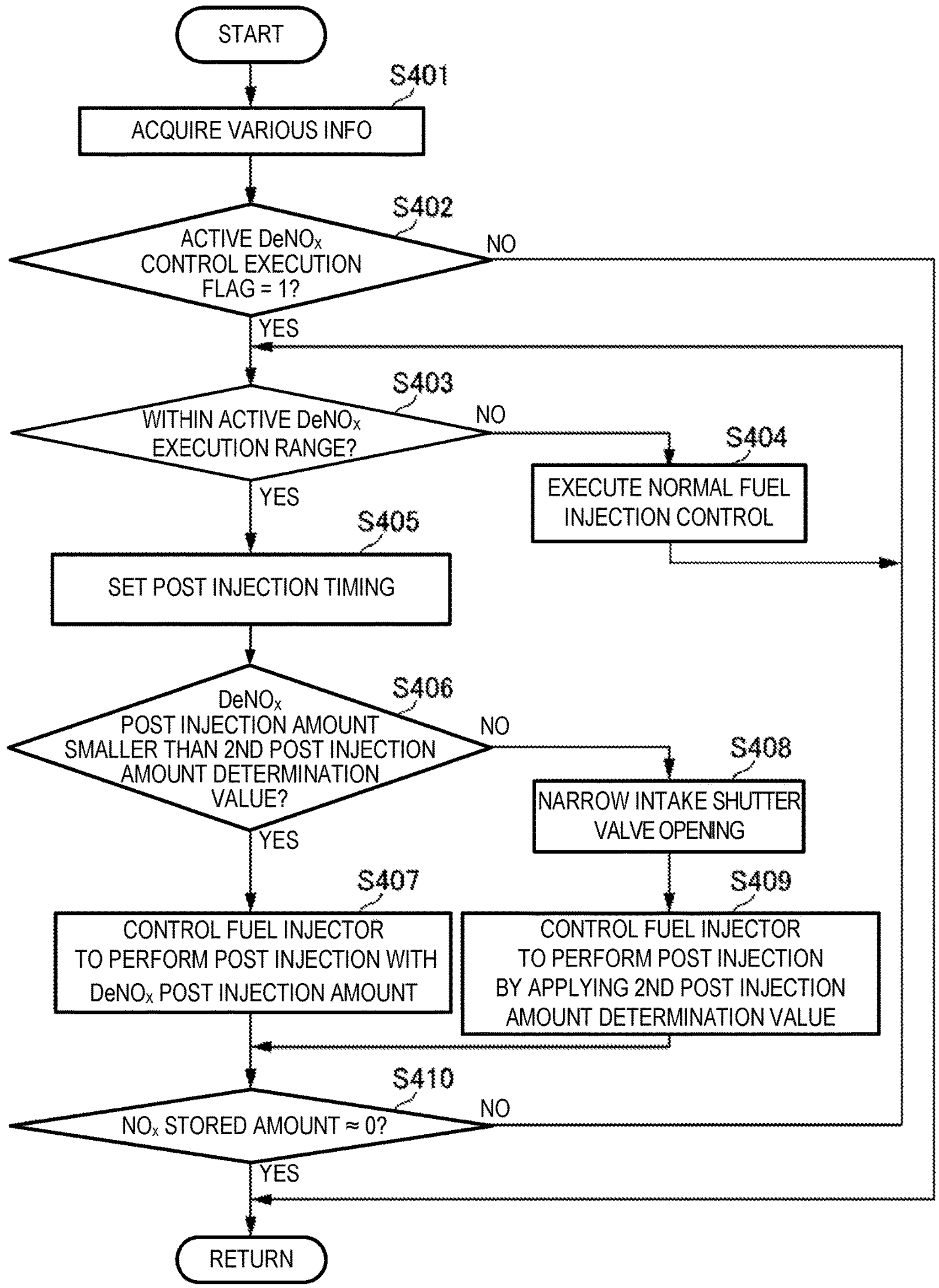
FIG. 10 is a flowchart illustrating the active $DeNO_x$ control of the embodiment.

Next, the active $DeNO_x$ control of this embodiment executed based on the active $DeNO_x$ control execution flag set as described above is described with reference to the flowchart (active $DeNO_x$ control process) of FIG. 10. The PCM 60 repeatedly executes this active $DeNO_x$ control process at a given cycle in parallel with the fuel injection control process illustrated in FIG. 3, and the active $DeNO_x$ control execution flag setting process illustrated in FIG. 7, etc.

First, at S401, the PCM 60 acquires various information of the vehicle. For example, the PCM 60 at least acquires the engine load, the engine speed, the $NO_x$ catalyst temperature, the $DeNO_x$ post-injection amount calculated in the $DeNO_x$ post injection amount calculation process illustrated in FIG. 5 (specifically, the $DeNO_x$ post injection amount calculated to be applied in the active $DeNO_x$ control), and the value of the active $DeNO_x$ control execution flag set in the active $DeNO_x$ control execution flag setting process illustrated in FIG. 7.

Next, at S402, the PCM 60 determines whether the active $DeNO_x$ control execution flag acquired at S401 is "1." In other words, the PCM 60 determines whether the active $DeNO_x$ control is to be executed. If the active $DeNO_x$ control execution flag is "1" (S402: YES), the process proceeds to S403. On the other hand, if the active $DeNO_x$ control execution flag is "0" (S402: NO), the process is terminated without executing the active $DeNO_x$ control.

At S403, the PCM 60 determines whether the operating state of the engine (engine load and engine speed) is within the active $DeNO_x$ execution range R12 (see FIG. 4). If the operating state of the engine is within the active $DeNO_x$ execution range R12 (S403: YES), the process proceeds to S405. On the other hand, if the operating state of the engine is outside the active $DeNO_x$ execution range R12 (S403: NO), the process proceeds to S404.

Next, at S405, the PCM 60 sets the post injection timing applied in the active $DeNO_x$ control. The method of setting the post injection timing is described in detail with reference to FIG. 13 which is described later.

Figure 13:
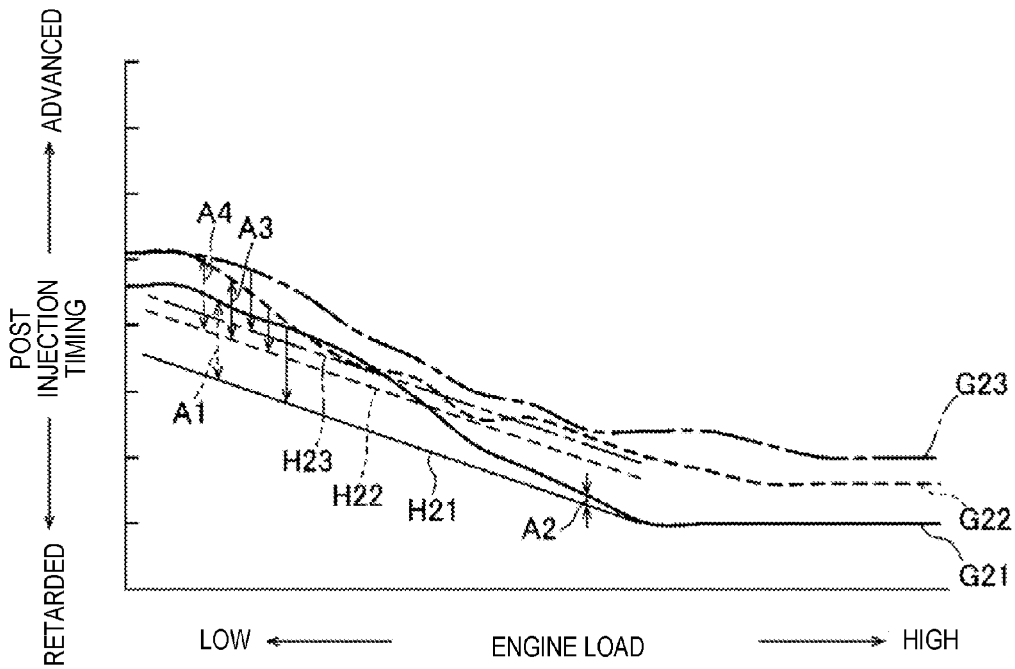
FIG. 13 is a chart illustrating methods of setting post injection timings applied in the active $DeNO_x$ control and the $NH_3$-supplied $DeNO_x$ control of the embodiment.

Next, the methods of setting the post injection timings applied in the active $DeNO_x$ control and the $NH_3$-supplied $DeNO_x$ control are specifically described with reference to the chart of FIG. 13. In FIG. 13, the horizontal axis indicates the engine load and the vertical axis indicates the post injection timing. The graphs G21, G22, and G23 indicate post injection timings to be set according to the engine load for different engine speeds. Specifically, the engine speed increases in the order of the graphs G21, G22, G23. The graph G21 corresponds to low engine speed, the graph G22 corresponds to medium engine speed, and the graph G23 corresponds to high engine speed.

In this embodiment, when executing the active $DeNO_x$ control, the air-fuel ratio is controlled to the target air-fuel ratio by combusting the post-injected fuel inside the cylinder. To combust the post-injected fuel inside the cylinder, the post injection may be performed at a comparatively advanced timing on the expansion stroke. However, if the post injection timing is excessively advanced, ignition occurs before air and fuel are suitably mixed, and smoke is generated. Therefore, in this embodiment, the post injection timing is suitably set on the advance side, specifically, a suitable timing in the early half of the expansion stroke is adopted as the post injection timing of the active $DeNO_x$ control, and a suitable amount of EGR gas is introduced in the active $DeNO_x$ control. Thus, the ignition of post-injected fuel is delayed to prevent the generation of smoke, etc. In this embodiment, as illustrated in FIG. 13, the post injection timing at least in the early half of the expansion stroke is retarded as the engine load becomes higher. This is because, since the fuel injection amount increases and it becomes easier for the smoke to be generated as the engine load increases, the post injection timing is retarded as much as possible. In this case, if the post injection timing is excessively retarded, it becomes easier for the post-injected fuel to be combusted (misfire) and HC is generated. Therefore, in this embodiment, the post injection timing is suitably retarded.

Further, in this embodiment, as illustrated in the graphs G21, G22, and G23, the post injection timing is advanced, i.e., the retarding amount of the post injection timing is reduced, as the engine speed becomes higher. When the engine speed is high, if the fuel is injected at the same crank angle as when the engine speed is low, a misfire may occur due to the short period of time for the fuel to ignite. Therefore, in this embodiment, the post injection timing is advanced as the engine speed increases so as to secure the combustion stability.

Returning to FIG. 10, at S404, without executing the active $DeNO_x$ control, i.e., without executing the fuel injection control which includes the post injection, the PCM 60 executes a normal fuel injection control which does not include the post injection for controlling the air-fuel ratio to the target air-fuel ratio. Typically, the PCM 60 only executes the control for causing the main injection with the fuel injection amount corresponding to the target torque. The PCM 60 actually executes the processing of S404, at S106 of the fuel injection control process illustrated in FIG. 3. Then, the process returns to S403 to perform the determination again. In other words, if the active $DeNO_x$ control execution flag is "1," the PCM 60 executes the normal fuel injection control while the operating state of the engine remains outside the active $DeNO_x$ execution range R12. When the operation state enters the active $DeNO_x$ execution range R12, the PCM 60 switches the control from the normal fuel injection control to the fuel injection control in the active $DeNO_x$ control. For example, when the operating state of the engine deviates from the active $DeNO_x$ execution range R12 during the fuel injection control in the active $DeNO_x$ control, the PCM 60 suspends the fuel injection control and executes the normal fuel injection control. Then, when the operating state enters the active $DeNO_x$ execution range R12, the PCM 60 resumes the fuel injection control in the active $DeNO_x$ control.

Next, at S406, the PCM 60 determines whether the $DeNO_x$ post injection amount acquired at S401 is smaller than the second post injection amount determination value.

Figure 8:
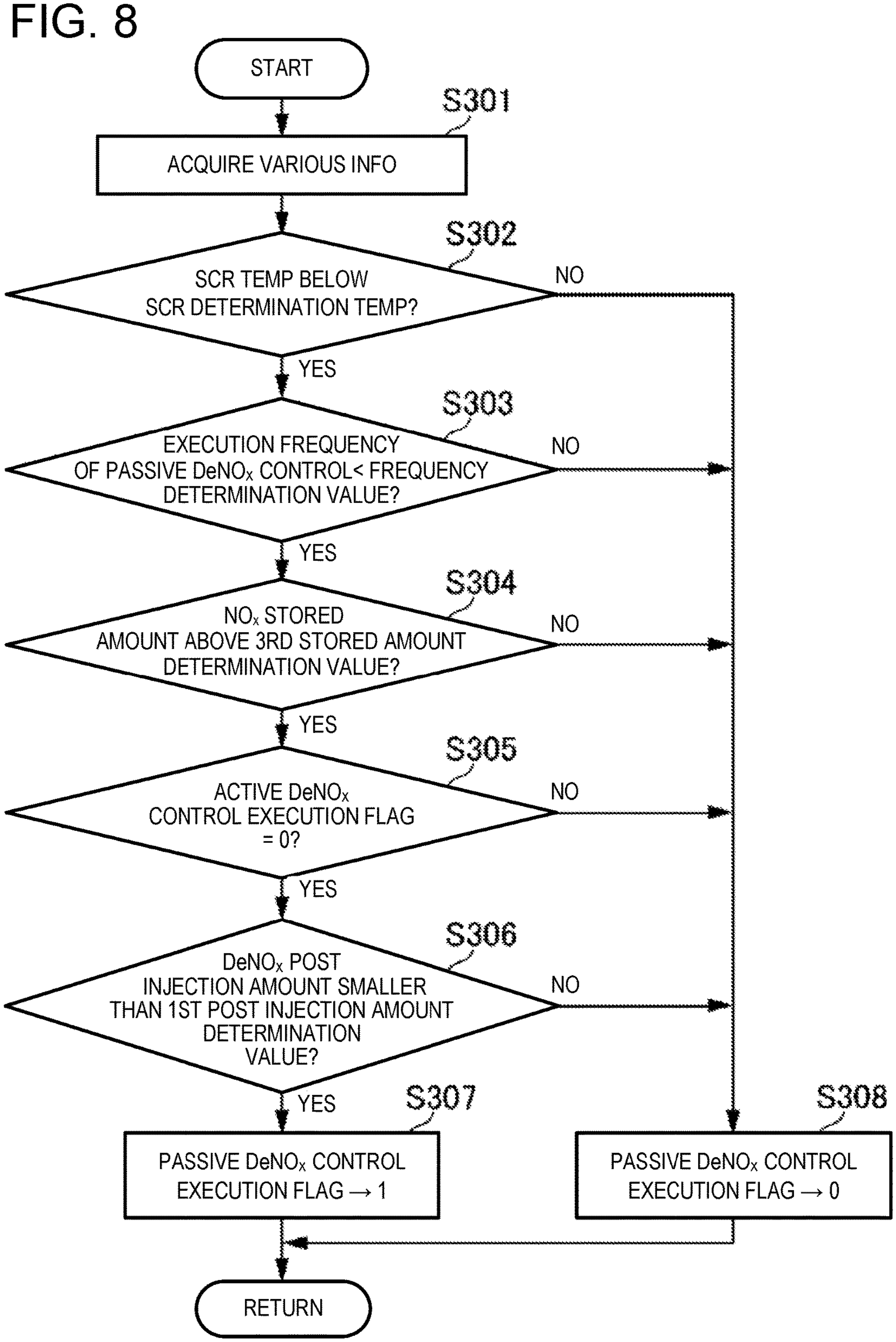
FIG. 8 is a flowchart illustrating setting of a passive $DeNO_x$ control execution flag of the embodiment.

The second post injection amount determination value is set larger than the first post injection amount determination value (see S306 in FIG. 8). Thus, it is possible to achieve a larger post injection amount in the active DeNO$_x$ control than in the passive DeNO$_x$ control, and the air-fuel ratio becomes controllable to the target air-fuel ratio regardless of the operating state of the engine E (e.g., even if it is not in a state where the air-fuel ratio reduces, such as during acceleration).

If the DeNO$_x$ post injection amount is smaller than the second post injection amount determination value (S406: YES), the process proceeds to S407 where the PCM 60 controls the fuel injector 20 to perform the post injection with the DeNO$_x$ post injection amount acquired at S401. The PCM 60 actually performs the processing of S407 at S106 of the fuel injection control process illustrated in FIG. 3. Then the process proceeds to S410.

On the other hand, if the DeNO$_x$ post injection amount is above the second post injection amount determination value (S406: NO), the process proceeds to S408. At S408, the PCM 60 reduces the oxygen concentration of air introduced into the engine E so as to control the air-fuel ratio to the target air-fuel ratio by using the post injection amount which is below the second post injection amount determination value (specifically, the second post injection amount determination value itself is applied as the DeNO$_x$ post injection amount). In this case, the PCM 60 executes at least one of a control for narrowing the opening of the intake shutter valve 7, a control for increasing the EGR gas amount, and a control for lowering the turbocharging pressure by the turbocharger 5, so as to reduce the oxygen concentration of the air introduced into the engine E, i.e., reduce the charging amount. For example, the PCM 60 obtains the turbocharging pressure required for controlling the air-fuel ratio to the target air-fuel ratio by using the DeNO$_x$ post injection amount to which the second post injection amount determination value is applied. The PCM 60 reduces the opening of the intake shutter valve 7 to be a desired opening based on the actual turbocharging pressure (the pressure detected by the pressure sensor 108) and the EGR gas amount so as to achieve this turbocharging pressure. Then, the process proceeds to S409.

Note that the intake shutter valve 7 is fully opened in the normal operating state of the engine E, whereas during DeNO$_x$, DPF regeneration, idle operation, etc., the opening of the intake shutter valve 7 is typically a given basic opening. In the operating state where the EGR gas is not introduced, the intake shutter valve 7 is feedback-controlled based on the turbocharging pressure.

At S409, the PCM 60 controls the fuel injector 20 to perform the post injection by applying the second post injection amount determination value to the DeNO$_x$ post injection amount, i.e., setting the DeNO$_x$ post injection amount to be the second post injection amount determination value. The PCM 60 actually performs the processing of S409 at S106 of the fuel injection control process illustrated in FIG. 3. Then the process proceeds to S410.

At S410, the PCM 60 determines whether the NO$_x$ stored amount in the NO$_x$ catalyst 45 is substantially zero. For example, the PCM 60 determines whether the NO$_x$ stored amount is substantially zero when the NO$_x$ stored amount estimated based on the operating state of the engine E, the flow rate of the exhaust gas, the temperature of the exhaust gas, etc. becomes substantially zero and the detection value of the NO$_x$ sensor 116 disposed immediately downstream of the DPF 46 changes (S410: YES). Then the process ends. Here, the PCM 60 ends the active DeNO$_x$ control process. The PCM 60 further resets the NO$_x$ stored amount used in the active DeNO$_x$ control process and the active DeNO$_x$ control execution flag setting process in FIG. 7 to zero.

On the other hand, when the NO$_x$ stored amount is not substantially zero (S410: NO), the process returns to S403. In this case, the PCM 60 continues the active DeNO$_x$ control. In other words, the PCM 60 continues the active DeNO$_x$ control until the NO$_x$ stored amount becomes substantially zero. Particularly, even if the execution condition of the active DeNO$_x$ control (e.g., the condition of S403) is not satisfied during the active DeNO$_x$ control and the active DeNO$_x$ control is suspended, when the execution condition of the active DeNO$_x$ control is satisfied thereafter, the PCM 60 promptly resumes the active DeNO$_x$ control to bring the NO$_x$ stored amount to substantially zero.

Here, the NO$_x$ stored amount is determinable as substantially zero based on the detection value of the NO$_x$ sensor 116 because of the following reason. Since the NO$_x$ sensor 116 also functions as an oxygen concentration sensor, the detection value of the NO$_x$ sensor 116 corresponds to the air-fuel ratio reaches the NO$_x$ sensor 116. While the NO$_x$ catalyst 45 performs reduction, i.e., when the NO$_x$ stored amount is not substantially zero, oxygen generated by reducing NO$_x$ reaches the NO$_x$ sensor 116. On the other hand, when the NO$_x$ stored amount becomes substantially zero, such oxygen generated by reduction is no longer reaches the NO$_x$ sensor 116. Therefore, at the timing when the NO$_x$ stored amount becomes substantially zero, the air-fuel ratio reached the NO$_x$ sensor 116 reduces, thus the detection value of the NO$_x$ sensor 116 changes.

Figure 11:
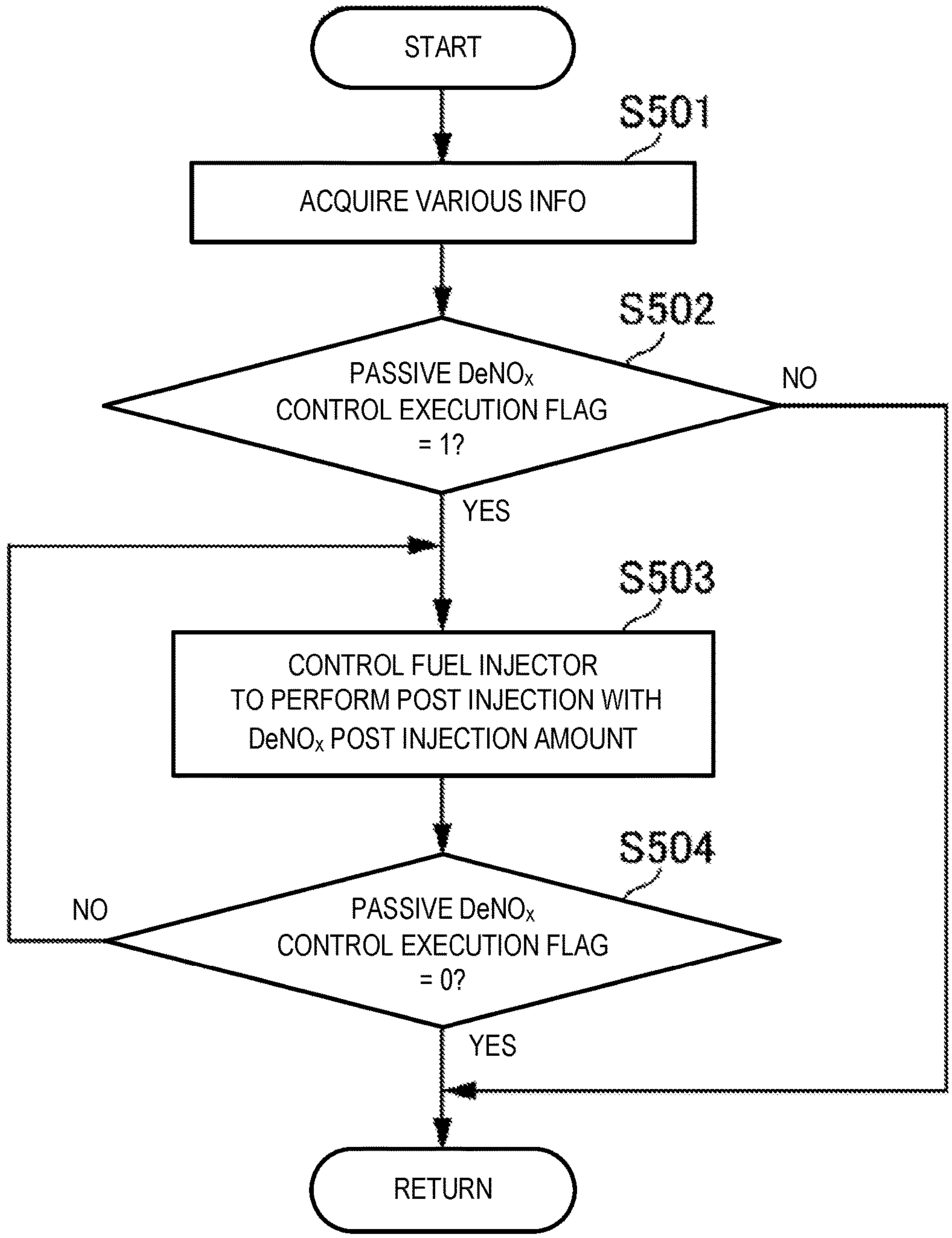
FIG. 11 is a flowchart illustrating the passive $DeNO_x$ control of the embodiment.

Next, the passive DeNO$_x$ control executed based on the passive DeNO$_x$ control execution flag set as described above is described with reference to the flowchart (passive DeNO$_x$ control process) of FIG. 11. This passive DeNO$_x$ control process is executed repeatedly at a given cycle by the PCM 60 and is executed in parallel with the fuel injection control process illustrated in FIG. 3 and the passive DeNO$_x$ control execution flag setting process illustrated in FIG. 8.

First, at S501, the PCM 60 acquires various information of the vehicle. For example, the PCM 60 acquires at least the DeNO$_x$ post injection amount calculated in the DeNO$_x$ post injection amount calculation process illustrated in FIG. 5 (specifically, the DeNO$_x$ post injection amount calculated to be applied in the passive DeNO$_x$ control) and the value of the passive DeNO$_x$ control execution flag set in the passive DeNO$_x$ control execution flag setting process illustrated in FIG. 8.

Next, at S502, the PCM 60 determines whether the passive DeNO$_x$ control execution flag acquired at S501 is "1." In other words, the PCM 60 determines whether the passive DeNO$_x$ control is to be executed. If the passive DeNO$_x$ control execution flag is "1" (S502: YES), the process proceeds to S503. On the other hand, if the passive DeNO$_x$ control execution flag is "0" (S502: NO), the process is terminated without executing the passive DeNO$_x$ control.

Next, at S503, the PCM 60 controls the fuel injector 20 to perform the post injection with the DeNO$_x$ post injection amount acquired at S501, i.e., executes the passive DeNO$_x$ control. Actually, the PCM 60 performs the processing of S503 at S106 of the fuel injection control process illustrated in FIG. 3. Then the process proceeds to S504.

At S504, the PCM 60 determines whether the passive DeNO$_x$ control execution flag is "0." If the passive DeNO$_x$ control execution flag is "0" (S504: YES), the process ends. In this case, the PCM 60 ends the passive DeNO$_x$ control process. On the other hand, if the passive DeNO$_x$ control execution flag is not "0" (S504: NO), i.e., if the passive $DeNO_x$ control execution flag is maintained at "1," the process returns to S503. In this case, the PCM 60 continues the passive $DeNO_x$ control process. In other words, the PCM 60 continues the passive $DeNO_x$ control until the passive $DeNO_x$ control execution flag switches from "1" to "0."

Figure 12:
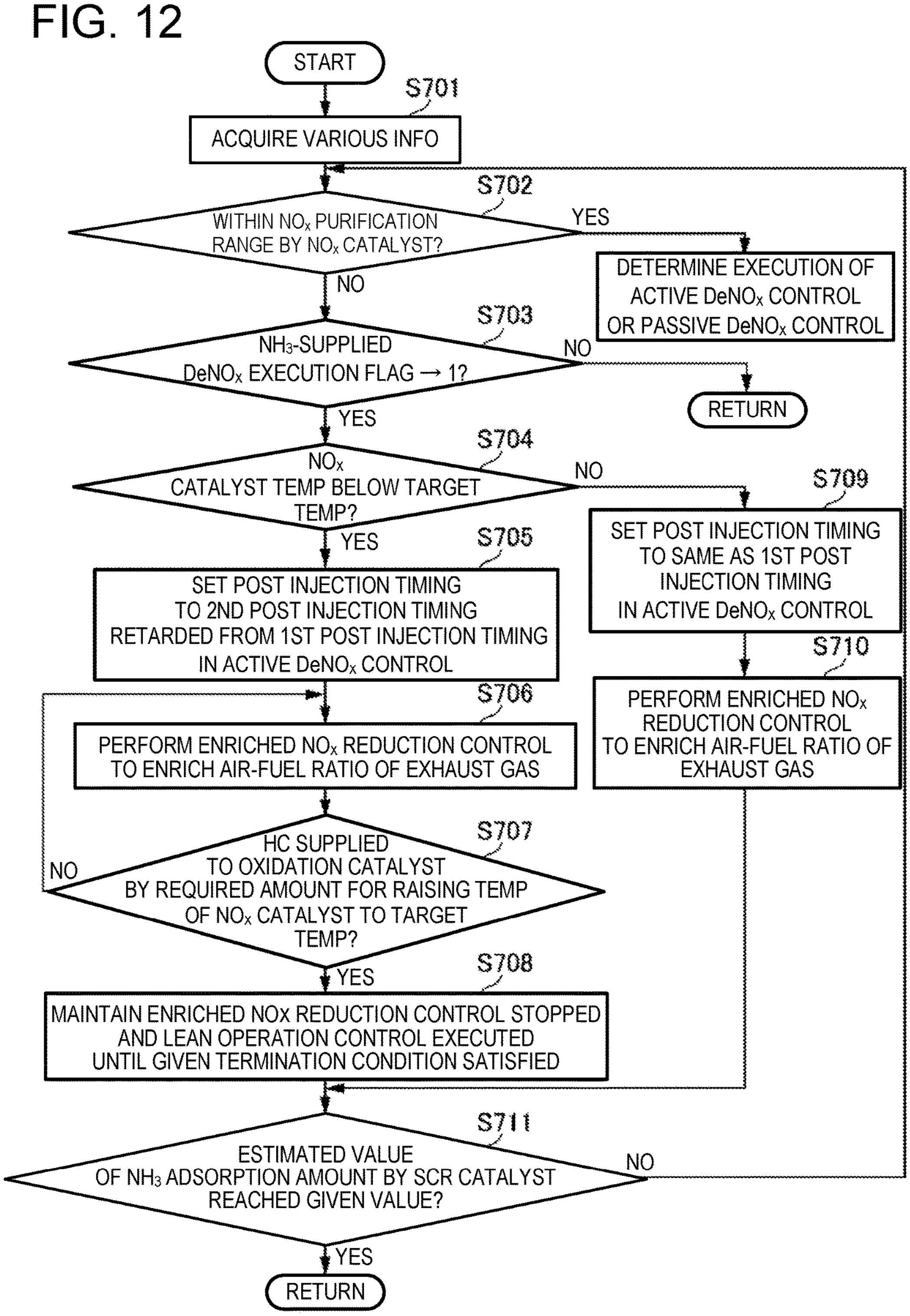
FIG. 12 is a flowchart illustrating an $NH_3$-supplied $DeNO_x$ control of the embodiment.

Next, the $NH_3$-supplied $DeNO_x$ control executed based on the $NH_3$-supplied $DeNO_x$ control execution flag set as described above in this embodiment is described with reference to the flowchart ($NH_3$-supplied $DeNO_x$ control process) of FIG. 12. The PCM 60 repeatedly executes this $NH_3$-supplied $DeNO_x$ control process at a given cycle in parallel with the fuel injection control process illustrated in FIG. 3 and the $NH_3$-supplied $DeNO_x$ control execution flag setting process illustrated in FIG. 9.

First, at S701, the PCM 60 acquires various information of the vehicle. For example, the PCM 60 acquires at least the engine load, the engine speed, the $NO_x$ catalyst temperature, the SCR temperature, the $DeNO_x$ post injection amount calculated in the $DeNO_x$ post injection amount calculation process illustrated in FIG. 5 (specifically, the $DeNO_x$ post injection amount calculated so as to be applied to the $NH_3$-supplied $DeNO_x$ control), and the value of the $NH_3$-supplied $DeNO_x$ control execution flag set in the $NH_3$-supplied $DeNO_x$ control execution flag setting process illustrated in FIG. 9.

Next, at S702, the PCM 60 determines whether the $NO_x$ catalyst temperature acquired at S701 is within a given temperature range corresponding to a range where the $NO_x$ purification rate of the $NO_x$ catalyst 45 is comparatively high (a comparatively low temperature range of the $NO_x$ catalyst 45). In other words, the PCM 60 determines whether $NO_x$ is to be purified by the $NO_x$ catalyst 45 (whether the temperature of the $NO_x$ catalyst 45 is comparatively low) or by the SCR catalyst 47 (the temperature of the SCR catalyst 47 is comparatively high). Note that at S702, the PCM 60 may determine whether the SCR temperature acquired at S701 is within a given temperature range corresponding to a range where the $NO_x$ purification rate of the SCR catalyst 47 is comparatively high (a comparatively low temperature range of the SCR catalyst 47).

If the $NO_x$ catalyst temperature is outside the given temperature range (and/or the SCR temperature is within the given temperature range) (S702: NO), the process proceeds to S703. On the other hand, if the $NO_x$ catalyst temperature is within the temperature range (and/or the SCR temperature is outside the given temperature range) (S702: YES), the process proceeds to determining whether to execute the active $DeNO_x$ control or the passive $DeNO_x$ control.

In other words, when the SCR temperature is within the given temperature range corresponding to the range where the $NO_x$ purification rate of the SCR catalyst 47 is comparatively high, even if the $NO_x$ purification rate of the $NO_x$ catalyst 45 somewhat decreases, the $NH_3$-supplied $DeNO_x$ control (described later) which is effective in generating $NH_3$ is executed. Note that within the range where the $NO_x$ purification rate of the SCR catalyst 47 is comparatively high, even if the $NO_x$ purification rate of the $NO_x$ catalyst 45 somewhat decreases, since the $NO_x$ is effectively purified by the SCR catalyst 47 further downstream of the $NO_x$ catalyst 45, the $NO_x$ purification performance is maintained.

Next, at S703, the PCM 60 determines whether the $NH_3$-supplied $DeNO_x$ control execution flag acquired at S701 is "1." In other words, the PCM 60 determines whether the $NH_3$-supplied $DeNO_x$ control is to be executed. If the $NH_3$-supplied $DeNO_x$ control execution flag is "1" (S703: YES), the process proceeds to S704. On the other hand, if the $NH_3$-supplied $DeNO_x$ control execution flag is "0" (S703: NO), the process returns to S701 without executing the $NH_3$-supplied $DeNO_x$ control.

Next, at S704, the PCM 60 determines whether the temperature of the $NO_x$ catalyst 45 is below a target temperature. If the temperature of the $NO_x$ catalyst 45 has reached the target temperature, generation of $NH_3$ on the $NO_x$ catalyst 45 by the combination of "N" component (nitrogen component) and "H" component (hydrogen component) in the exhaust gas is stimulated, and it becomes easy for $NH_3$ to be generated in the $NO_x$ catalyst 45. Therefore, even in the case of executing the air-fuel-ratio-enriched $NO_x$ reduction control applying the post injection timing which is substantially the same as the active $DeNO_x$ control, a larger amount of $NH_3$ than the amount of $NH_3$ generated by the $NO_x$ catalyst 45 in the air-fuel-ratio-enriched $NO_x$ reduction control is generated and a comparatively large amount of $NH_3$ is supplied from the $NO_x$ catalyst 45 to the SCR catalyst 47. As the temperature of the $NO_x$ catalyst 45 rises, the generation of $NH_3$ is stimulated and the $NH_3$ generation amount is increased.

If the temperature of the $NO_x$ catalyst 45 is below the target temperature (S704: YES), the process proceeds to S705. On the other hand, if the temperature of the $NO_x$ catalyst 45 is above the target temperature (S704: NO), the process proceeds to S709.

At S705, the PCM 60 sets the post injection timing of the $NH_3$-supplied $DeNO_x$ control to a second post injection timing that is retarded from the post injection timing in the normal $NO_x$ reduction control, e.g., the active $DeNO_x$ control. Then the process proceeds to S706.

As illustrated in FIG. 13, when executing the $NH_3$-supplied $DeNO_x$ control, the PCM 60 sets the post injection timing of the $NH_3$-supplied $DeNO_x$ control to be the timing retarded from the post injection timing of the active $DeNO_x$ control (see S705) or the same as the post injection timing of the active $DeNO_x$ control (see S709). The case of setting the post injection timing of the $NH_3$-supplied $DeNO_x$ control to be same as the post injection timing of the active $DeNO_x$ control is illustrated in the graphs G21, G22, G23 and the description thereof is omitted since it is the same as that of the post injection timing of the active $DeNO_x$ control.

Here, the case of setting the post injection timing of the $NH_3$-supplied $DeNO_x$ control (the post injection timing of the air-fuel-ratio-enriched $NO_x$ reduction control during the $NH_3$-supplied $DeNO_x$ control) to the timing retarded from the post injection timing of the active $DeNO_x$ control is described.

When the engine speed is low, the retarded post injection timing of the $NH_3$-supplied $DeNO_x$ control is as illustrated by the graph H21 on the retarded side of the graph G21. When the engine speed is medium, the retarded post injection timing of the $NH_3$-supplied $DeNO_x$ control is as illustrated by the graph H22 on the retarded side of the graph G22. When the engine speed is high, the retarded post injection timing of the $NH_3$-supplied $DeNO_x$ control is as illustrated by the graph H23 on the retarded side of the graph G23. The graphs H21 to H23 are merely imaginary graphs for illustrative purpose, and the graphs H21 to H23 on the retarded side of the graphs G21 to G23, respectively, are calculated by the PCM 60 as values retarded by about several degrees. The retarded post injection timing of the $NH_3$-supplied $DeNO_x$ control is also applied to the post injection timing of the active $DeNO_x$ control other than the graphs G21 to G23.

In this manner, when executing the air-fuel-ratio-enriched $NO_x$ reduction control during the $NH_3$-supplied $DeNO_x$ control by applying the post injection timing retarded from the post injection timing of the active $DeNO_x$ control, a larger amount of unburned fuel than that in the exhaust passage 41 in the active $DeNO_x$ control is supplied to the exhaust passage 41. Thus, unburned fuel contained in the exhaust gas in the exhaust passage 41 and HC contained in the unburned fuel are increased so that the amount of HC adsorbed by the oxidation catalyst of the $NO_x$ catalyst 45 is increased.

The PCM 60 determines the retarded amount of the post injection timing in the $NH_3$-supplied $DeNO_x$ control to be larger when the engine load is low than when the engine load is high (or medium). For example, when the engine speed is low, as illustrated in the graphs G21 and H21, the retarded amount of the post injection timing in the $NH_3$-supplied $DeNO_x$ control is determined so that a retarded amount A1 when the engine load is low is larger than a retarded amount A2 when the engine load is high (or medium). In this manner, when the engine load is low, the amount of unburned fuel contained in the exhaust gas in the exhaust passage 41 is increased, while, when the engine load is high, the exhaust gas temperature is prevented from rising due to excessive retarding of the post injection timing and from thus affecting the reliability of other parts in the exhaust passage 41.

Further, only when the engine load is low, the PCM 60 executes the $NH_3$-supplied $DeNO_x$ control applying the post injection timing retarded from the post injection timing of the active $DeNO_x$ control. In this manner, only when the engine load is low, a larger amount of unburned fuel than that in the exhaust passage 41 in the active $DeNO_x$ control is supplied to the exhaust passage 41 by retarding the post injection timing. Moreover, when the engine load is high, the exhaust gas temperature is prevented from rising due to excessive retarding of the post injection timing and from thus affecting the reliability of other parts in the exhaust passage 41.

Further, the PCM 60 determines the retarded amount of the post injection timing in the $NH_3$-supplied $DeNO_x$ control so that the retarded amount is larger when the engine speed is low than when the engine speed is high. For example, the retarded amount A1 from the graph G21 to the graph H21 when the engine speed is low is determined to be larger than a retarded amount A3 from the graph G22 to the graph H22 when the engine speed is medium. Moreover, the retarded amount A1 is determined to be larger than a retarded amount A4 from the graph G23 to the graph H23 when the engine speed is high. In this manner, when the engine speed is high, the exhaust temperature is prevented from rising due to excessive retarding of the post injection timing and from thus affecting the reliability of other parts in the exhaust passage 41.

Further, only when the engine speed is low, the PCM 60 executes the $NH_3$-supplied $DeNO_x$ control applying the post injection timing retarded from the post injection timing of the active $DeNO_x$ control. In this manner, only when the engine speed is low, the post injection timing is retarded and a larger amount of unburned fuel than that in the exhaust passage 41 in the active $DeNO_x$ control is supplied to the exhaust passage 41. Moreover, when the engine speed is high, the exhaust gas temperature is prevented from rising due to excessive retarding of the post injection timing and from thus affecting the reliability of other parts in the exhaust passage 41.

Note that the PCM 60 may set the retarded amount of the post injection timing in the $NH_3$-supplied $DeNO_x$ control so that the post injected fuel is combusted inside the cylinder of the engine. Here, discharge of the post-injected fuel as unburned fuel or engine oil dilution due to the post-injected fuel is prevented.

At S706, the PCM 60 starts the air-fuel-ratio-enriched $NO_x$ reduction control in which the air-fuel ratio of the exhaust gas is enriched to the second target air-fuel ratio which is richer than the first target air-fuel ratio. Here, the first target air-fuel ratio is a target air-fuel ratio set in the active $DeNO_x$ control and at which $NO_x$ stored in the $NO_x$ catalyst 45 is reducible. As illustrated in FIG. 6, the second target air-fuel ratio is a target air-fuel ratio to be set according to the ammonia adsorption amount of the SCR catalyst 47 when the $NH_3$-supplied $DeNO_x$ control is executed. As illustrated in FIG. 6, the second target air-fuel ratio is set to be richer than the first target air-fuel ratio with respect to the ammonia adsorption amount of the SCR catalyst 47. In the air-fuel-ratio-enriched $NO_x$ reduction control, by enriching the air-fuel ratio to the second target air-fuel ratio, in either of the case where the combustion in the cylinder of the engine is performed or the case where unburned fuel is discharged to the exhaust passage, the H component supplied to the $NO_x$ catalyst 45 is increased and the amount of $NH_3$ generated in the $NO_x$ catalyst 45 is easily increased.

At S706, the PCM 60 performs the post injection at the second post injection timing set at S705. As illustrated in FIG. 5, the post injection amount here is determined at S115.

Thus, the PCM 60 executes the air-fuel-ratio-enriched $NO_x$ reduction control in which a larger amount of unburned fuel than that in the exhaust passage in the active $DeNO_x$ control is supplied to the exhaust passage and the exhaust gas of which air-fuel ratio is enriched to the second target air-fuel ratio is supplied to the exhaust passage 41. Then, the process proceeds to S707.

At S707, the PCM 60 determines whether HC contained in the unburned fuel within the exhaust gas in the exhaust passage is supplied to (or adsorbed by) the oxidation catalyst 45*a* by a required amount for raising the temperature of the $NO_x$ catalyst 45 to the target temperature. If the required amount of HC for the temperature rise is supplied to (or adsorbed by) the oxidation catalyst 45*a* (S707: YES), the process proceeds to S708. On the other hand, if HC is not supplied by the required amount (S707: NO), the process returns to S706.

At S708, the PCM 60 executes a lean air-fuel ratio operation control by stopping (suspending) the air-fuel-ratio-enriched $NO_x$ reduction control to bring the operating state of the engine to a normal operating state where the air-fuel ratio becomes leaner than the theoretical air-fuel ratio λ1 (where the $NO_x$ reduction control is not executed). In the lean air-fuel ratio operation control, the amount of oxygen supplied to the exhaust gas increases, and heat is generated by the oxidation between oxygen and HC adsorbed by the oxidation catalyst 45*a*. Thus, the temperature of the oxidation catalyst 45*a* rises by the heat of reaction and the temperature of the $NO_x$ catalyst 45 provided with the oxidation catalyst 45*a* also rises by this heat of reaction.

Note that the PCM 60 may achieve the lean air-fuel ratio operation control by stopping the air-fuel-ratio-enriched $NO_x$ reduction control to bring the operating state of the engine to a different operating state where the air-fuel ratio becomes leaner than the theoretical air-fuel ratio. Further, the PCM 60 may achieve the lean air-fuel ratio operation control by bringing the operating state of the engine to a different operating state where the air-fuel ratio becomes leaner than the target air-fuel ratio. Simply by stopping the air-fuel-ratio enriched $NO_x$ reduction control, the PCM 60 switches the control from the air-fuel-ratio-enriched $NO_x$ reduction control in which the air-fuel ratio is enriched to the lean air-fuel ratio operation control in which the air-fuel ratio becomes leaner than the target air-fuel ratio, and executes it. Further, the temperatures of the oxidation catalyst 45*a* and the $NO_x$ catalyst 45 are raised comparatively easily by the reaction between oxygen and HC adsorbed by the oxidation catalyst 45*a*.

At S708, the PCM 60 maintains the state where the air-fuel-ratio-enriched $NO_x$ reduction control is stopped and the lean air-fuel ratio operation control is executed until a given termination condition is satisfied. The given termination condition includes, for example, lapse of reaction time which is calculated based on the estimated value of the supply amount of HC supplied to the oxidation catalyst 45*a* and is assumed to be required for completing the reaction between HC and oxygen. By executing the lean air-fuel ratio operation control until this reaction time elapses, substantially all of HC adsorbed by the oxidation catalyst 45*a* is effectively consumed to react with oxygen so as to raise the temperature of the $NO_x$ catalyst 45. Further, the lean air-fuel ratio operation control is executed for the amount of HC adsorbed by the oxidation catalyst 45*a*, and the temperature of the $NO_x$ catalyst 45 is effectively raised. The control for executing the air-fuel-ratio-enriched $NO_x$ reduction control at S705 to S707 and then executing the lean air-fuel ratio operation control at S708 to raise the temperature of the $NO_x$ catalyst 45 is referred to as the temperature raising control. In other words, the temperature raising control includes the air-fuel-ratio-enriched $NO_x$ reduction control and the lean air-fuel ratio operation control. After the given reaction time elapses, the PCM 60 terminates the air-fuel-ratio-enriched $NO_x$ reduction control and the lean air-fuel ratio operation control, and the process proceeds to S711.

Next, at S711, the PCM 60 determines whether the estimated value of the adsorption amount of $NH_3$ adsorbed by the SCR catalyst 47 has reached a given value.

If the estimated value of the adsorption amount of $NH_3$ adsorbed by the SCR catalyst 47 has reached the given value (S711: YES), the PCM 60 terminates the $NH_3$-supplied $DeNO_x$ control in which $NH_3$ is supplied from the $NO_x$ catalyst 45 to the SCR catalyst 47, and the process returns to S701.

On the other hand, if the estimated value of the adsorption amount of $NH_3$ adsorbed by the SCR catalyst 47 has not reached the given value (S711: NO), the process returns to S702.

Then, the process proceeds from S703 to S704. If the temperature of the $NO_x$ catalyst 45 is below the target temperature (S704: YES), the process again proceeds to S705. Thus, the temperature raising control including the air-fuel-ratio-enriched $NO_x$ reduction control and the lean air-fuel ratio operation control is repeated until the temperature of the $NO_x$ catalyst 45 reaches the target temperature at which the $NH_3$ generation becomes easy.

At S704, if the PCM 60 determines that the temperature of the $NO_x$ catalyst 45 is above the target temperature (S704: NO), the process proceeds to S709 without executing the temperature raising control.

Next, at S709, in the air-fuel-ratio-enriched $NO_x$ reduction control, the PCM 60 sets the post injection timing same as (not retarded from) the post injection timing in the normal $NO_x$ reduction control, e.g., the active $DeNO_x$ control. Then the process proceeds to S710.

At S710, the PCM 60 starts the air-fuel-ratio-enriched $NO_x$ reduction control in which the air-fuel ratio of the exhaust gas is enriched to the second target air-fuel ratio which is richer than the first target air-fuel ratio. Here, the first target air-fuel ratio is a target air-fuel ratio set in the active $DeNO_x$ control and at which $NO_x$ stored in the $NO_x$ catalyst 45 is reducible. As illustrated in FIG. 6, the second target air-fuel ratio is a target air-fuel ratio to be set according to the ammonia adsorption amount of the SCR catalyst 47 when the $NH_3$-supplied $DeNO_x$ control is executed. As illustrated in FIG. 6, the second target air-fuel ratio is set to be richer than the first target air-fuel ratio with respect to the ammonia adsorption amount of the SCR catalyst 47. In the air-fuel-ratio-enriched $NO_x$ reduction control, by enriching the air-fuel ratio to the second target air-fuel ratio, in either of the case where the combustion in the cylinder of the engine is performed or the case where unburned fuel is discharged to the exhaust passage, the H component supplied to the $NO_x$ catalyst 45 is increased and the amount of $NH_3$ generated in the $NO_x$ catalyst 45 is easily increased.

At S710, the PCM 60 performs the post injection at the first post injection timing set at S709. As illustrated in FIG. 5, the post injection amount here is determined at S115.

Therefore, the PCM 60 prevents the supply of unburned fuel to the exhaust passage at the first post injection timing as same as in the active $DeNO_x$ control basically so as to perform the in-cylinder combustion. The PCM 60 also executes the air-fuel-ratio-enriched $NO_x$ reduction control in which the exhaust gas of which air-fuel ratio is enriched to the second target air-fuel ratio is supplied to the exhaust passage. Then the process proceeds to S711.

According to the exhaust emission control system of the engine of the embodiment described above, when the urea injection by the urea injector 51 is determined to be abnormal, the $NO_x$ reduction controlling module performs the $NO_x$ reduction control in which the air-fuel ratio of the exhaust gas is enriched, and then performs the lean air-fuel ratio operation control in which the air-fuel ratio of the exhaust gas becomes leaner than the target air-fuel ratio. Therefore, the temperatures of the oxidation catalyst 45*a* and the $NO_x$ catalyst 45 are raised by the reaction between oxygen and HC adsorbed by the oxidation catalyst 45*a*. By performing the $NO_x$ reduction control again in the state where the temperature of the $NO_x$ catalyst 45 is raised, it becomes easier for $NH_3$ to be generated in the $NO_x$ catalyst 45 and the comparatively large amount of $NH_3$ is supplied from the $NO_x$ catalyst 45 to the SCR catalyst 47. Therefore, when the urea injection by the urea injector 51 is determined to be abnormal, it is prevented that $NH_3$ adsorbed by the SCR catalyst 47 becomes insufficient for the SCR catalyst 47 to purify $NO_x$, and the adsorption amount of $NH_3$ in the SCR catalyst 47 is increased so that the purification rate of $NO_x$ within exhaust gas by the SCR catalyst 47 becomes higher. Thus, the $NO_x$ discharge amount is reduced.

Further, according to the exhaust emission control system of the engine of this embodiment, the lean air-fuel ratio operation control is performed by stopping the $NO_x$ reduction control to bring the operating state of the engine to the normal operating state where the air-fuel ratio becomes leaner than the theoretical air-fuel ratio. Therefore, the lean air-fuel ratio operation control is performed by a comparatively simple control, the temperatures of the oxidation catalyst 45*a* and the $NO_x$ catalyst 45 are raised comparatively easily by the reaction between oxygen and HC adsorbed by the oxidation catalyst 45*a*, and the comparatively large amount of $NH_3$ is supplied from the $NO_x$ catalyst 45 to the SCR catalyst 47.

Further, according to the exhaust emission control system of the engine of this embodiment, the $NO_x$ reduction controlling module repeatedly performs the temperature raising control of the $NO_x$ catalyst 45 by performing the $NO_x$ reduction control and then performing the lean air-fuel ratio operation control, until the temperature of the $NO_x$ catalyst 45 reaches the target temperature. After the temperature of the $NO_x$ catalyst 45 reaches the target temperature, the $NO_x$ reduction controlling module performs the $NO_x$ reduction control without performing the temperature raising control. In other words, the $NO_x$ reduction control is performed in the state where the temperature of the $NO_x$ catalyst 45 is raised to the target temperature at which the $NH_3$ generation becomes easy. Thus, it becomes easier for $NH_3$ to be generated in the $NO_x$ catalyst 45 and the comparatively large amount of $NH_3$ is supplied from the $NO_x$ catalyst 45 to the SCR catalyst 47.

Further, according to the exhaust emission control system of the engine of this embodiment, the $NO_x$ reduction controlling module starts the lean air-fuel ratio operation control after the estimated value of the supply amount of HC to the oxidation catalyst 45*a* of the $NO_x$ catalyst 45 reaches the given value corresponding to a required amount for raising the temperature to the target temperature. Therefore, the temperatures of the oxidation catalyst 45*a* and the $NO_x$ catalyst 45 are raised to the target temperatures by the reaction between oxygen and HC adsorbed by the oxidation catalyst 45*a*. Thus, the temperature of the $NO_x$ catalyst 45 is raised toward the target temperature in the lean air-fuel ratio operation control, by performing the $NO_x$ reduction control in the state where the temperature of the $NO_x$ catalyst 45 is raised to the target temperature at which the $NH_3$ generation becomes easy, it becomes easier for $NH_3$ to be generated in the $NO_x$ catalyst 45 and the comparatively large amount of $NH_3$ is supplied from the $NO_x$ catalyst 45 to the SCR catalyst 47.

Further, according to the exhaust emission control system of the engine of this embodiment, the lean air-fuel ratio operation control is terminated when the reaction time which is calculated based on the estimated value of the supply amount of HC to the oxidation catalyst 45*a* of the $NO_x$ catalyst 45 and is assumed to be required for completing the reaction between HC and oxygen elapses. Thus, HC adsorbed by the oxidation catalyst 45*a* effectively reacts with oxygen during the lean air-fuel ratio operation control, and the temperatures of the oxidation catalyst 45*a* and the $NO_x$ catalyst 45 are efficiently raised by the reaction between oxygen and HC adsorbed by the oxidation catalyst 45*a*.

Further, according to the exhaust emission control system of the engine of this embodiment, only when the urea injection by the urea injector 51 is determined to be abnormal, the temperature raising control of the $NO_x$ catalyst 45 is performed by performing the $NO_x$ reduction control and then performing the lean air-fuel ratio operation control. Therefore, other than when the urea injection by the urea injector 51 is determined to be abnormal, the $NO_x$ reduction control is reliably performed without performing the lean air-fuel ratio operation control and the temperature raising control accompanied thereby.

Further, according to the exhaust emission control system of the engine of this embodiment, when urea supplied to the urea injector 51 is frozen, it is prevented that $NH_3$ adsorbed by the SCR catalyst 47 becomes insufficient for the SCR catalyst 47 to purify $NO_x$, and the adsorption amount of $NH_3$ in the SCR catalyst 47 is increased so that the purification rate of $NO_x$ within exhaust gas by the SCR catalyst 47 becomes higher. Thus, the $NO_x$ discharge amount is reduced.

Further, according to the exhaust emission control system of the engine of this embodiment, when performing the $NO_x$ reduction control after the lean air-fuel ratio operation control, the post injection timing in the $NO_x$ reduction control is set so that the fuel injected in the post injection is combusted inside the cylinder of the engine. Therefore, discharge of the post-injected fuel as unburned fuel or oil dilution due to the post-injected fuel is prevented.

Further, according to the exhaust emission control system of the engine of this embodiment, when the urea injection by the urea injector 51 is determined to be abnormal in the case where the temperature of the exhaust gas is comparatively high and $NO_x$ within the exhaust gas is required to be purified by the SCR catalyst 47, the $NO_x$ reduction controlling module performs the $NH_3$-supplied $NO_x$ reduction control. Therefore, it is prevented that $NH_3$ adsorbed by the SCR catalyst 47 becomes insufficient for the SCR catalyst 47 to purify $NO_x$, and the adsorption amount of $NH_3$ in the SCR catalyst 47 is increased so that the purification rate of $NO_x$ within exhaust gas by the SCR catalyst 47 becomes higher. Thus, the $NO_x$ discharge amount is reduced.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

20 Fuel Injector
41 Exhaust Passage
43 EGR Device
43*a* EGR Passage
43*b* EGR Cooler
43*c* First EGR Valve
43*d* EGR Cooler Bypass Passage
43*e* Second EGR Valve
45 $NO_x$ Catalyst
45*a* Diesel Oxidation Catalyst
47 SCR Catalyst
51 Urea Injector
53 Urea Supply Path
54 Urea Sending Pump
55 Urea Tank
56 Urea Supply Path Pressure Sensor
57 Urea Path Heater
58 Urea Level Sensor
59 Urea Temperature Sensor
61 Urea Tank Heater
200 Engine System
E Engine
EX Exhaust System
FS Fuel Supply System
IN Intake System
λ1 Theoretical Air-fuel Ratio
λ2 Limit Air-fuel Ratio

What is claimed is:

1. An exhaust emission control system of an engine, including a $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is stoichiometric or rich, the $NO_x$ catalyst also functioning as an oxidation catalyst for oxidizing HC, the system comprising:

a SCR catalyst disposed in the exhaust passage downstream of the $NO_x$ catalyst and for purifying $NO_x$ within exhaust gas by causing a reaction with $NH_3$;

a urea injector for supplying urea to the SCR catalyst by injecting urea to the exhaust passage; and a processor configured to execute:

a fuel injection controlling module for controlling a fuel injector; and a $NO_x$ reduction controlling module for performing a $NO_x$ reduction control in which the air-fuel ratio is enriched to reach a target air-fuel ratio so that the stored $NO_x$ is reduced, the target air-fuel ratio being a ratio at which the stored $NO_x$ is reducible, wherein when the urea injection by the urea injector is determined to be abnormal, the $NO_x$ reduction controlling module performs an $NH_3$-supplied $NO_x$ reduction control in which the $NO_x$ catalyst supplies $NH_3$ to the SCR catalyst, by performing the $NO_x$ reduction control, a lean air-fuel ratio operation control, and then the $NO_x$ reduction control again, the lean air-fuel ratio operation control being a control in which the air-fuel ratio becomes leaner than the target air-fuel ratio.

2. The system of claim 1, wherein the lean air-fuel ratio operation control is performed by stopping the $NO_x$ reduction control to bring an operating state of the engine to a normal operating state where the air-fuel ratio becomes lean.

3. The system of claim 1, wherein the $NO_x$ reduction controlling module repeatedly performs a temperature raising control of the $NO_x$ catalyst by performing the $NO_x$ reduction control and then the lean air-fuel ratio operation control until the temperature of the $NO_x$ catalyst reaches a target temperature, and when the temperature of the $NO_x$ catalyst reaches the target temperature, the $NO_x$ reduction controlling module performs the $NH_3$-supplied $NO_x$ reduction control by performing the $NO_x$ reduction control without executing the temperature raising control.

4. The system of claim 1, wherein the $NO_x$ reduction controlling module starts the lean air-fuel ratio operation control after an estimated value of a supply amount of HC to the oxidation catalyst of the $NO_x$ catalyst reaches a given value corresponding to a required amount for raising the temperature of the $NO_x$ catalyst to a target temperature.

5. The system of claim 1, wherein the $NO_x$ reduction controlling module terminates the lean air-fuel ratio operation control when a reaction time that is calculated based on an estimated value of a supply amount of HC to the oxidation catalyst of the $NO_x$ catalyst, and is assumed to be required for completing reaction between HC and oxygen, elapses.

6. The system of claim 1, wherein only when the urea injection by the urea injector is determined to be abnormal, the $NO_x$ reduction controlling module performs a temperature raising control of the $NO_x$ catalyst by performing the $NO_x$ reduction control and then performing the lean air-fuel ratio operation control.

7. The system of claim 1, wherein when urea supplied to the urea injector is frozen, the $NO_x$ reduction controlling module performs the $NH_3$-supplied $NO_x$ reduction control in which the $NO_x$ catalyst supplies $NH_3$ to the SCR catalyst, by performing the $NO_x$ reduction control, the lean air-fuel ratio operation control, and then the $NO_x$ reduction control again.

8. The system of claim 1, wherein when performing the $NO_x$ reduction control after the lean air-fuel ratio operation control, the $NO_x$ reduction controlling module sets a post injection timing in the $NO_x$ reduction control so that the fuel injected in a post injection is combusted inside a cylinder of the engine.

9. The system of claim 1, wherein the $NO_x$ reduction controlling module performs the $NH_3$-supplied $NO_x$ reduction control when the temperature of the exhaust gas is in a given high temperature range and $NO_x$ within the exhaust gas is required to be purified by the SCR catalyst.

* * * * *